United States Patent [19]

Beckner et al.

[11] Patent Number: 4,542,380
[45] Date of Patent: Sep. 17, 1985

[54] METHOD AND APPARATUS FOR GRACEFUL PREEMPTION ON A DIGITAL COMMUNICATIONS LINK

[75] Inventors: Mark W. Beckner, Warrenville; Thomas J. J. Starr, Wheaton, both of Ill.

[73] Assignee: AT&T Bell Laboratories, Murray Hill, N.J.

[21] Appl. No.: 454,172

[22] Filed: Dec. 28, 1982

[51] Int. Cl.$^4$ .......................... H04Q 9/00; H04J 6/00
[52] U.S. Cl. .................................. 340/825.5; 370/43; 370/61
[58] Field of Search ........................ 340/825.5, 825.12; 370/32, 94, 61, 99, 62, 85, 42, 43; 178/3; 375/8

[56] References Cited

U.S. PATENT DOCUMENTS

| | | | |
|---|---|---|---|
| 3,796,992 | 3/1974 | Nakamura et al. | 340/147 |
| 3,818,447 | 6/1974 | Craft | 340/147 |
| 3,975,712 | 8/1976 | Hepworth et al. | 340/147 |
| 4,063,220 | 12/1977 | Metcalfe et al. | 340/147 |
| 4,096,355 | 6/1978 | Rothauser et al. | 179/15 |
| 4,145,735 | 3/1979 | Soga | 340/825.51 |
| 4,161,719 | 7/1979 | Parikh et al. | 340/147 |
| 4,225,919 | 9/1980 | Kyu et al. | 370/99 |
| 4,271,507 | 6/1981 | Gable et al. | 370/94 |
| 4,292,623 | 9/1981 | Eswaran et al. | 340/147 |

Primary Examiner—Donald J. Yusko
Attorney, Agent, or Firm—Kenneth H. Samples; Ross T. Watland

[57] ABSTRACT

A method and apparatus for graceful preemption on a digital communications link used for selective communication from a plurality of user devices. Link controllers are used to implement the enforcement of a protocol on the link. When a first user device is actively communicating over the link, a second user device can gracefully preempt the first user device by having a link controller transmit a preempt character. The link controllers at either end of the link each save values of a set of status variables collectively defining the status of the link controller. When the second user device relinquishes link access, the saved values are used to return the link controllers to their status at the time of preemption such that the first user device can resume communication from the point of interruption without requiring data retransmission.

44 Claims, 20 Drawing Figures

TRANSMIT CONTROL
CIRCUIT 1301
STATE DIAGRAM

RECEIVE CONTROL CIRCUIT 2401 STATE DIAGRAM

RECEIVER STATE FIELD ENCODING

| RSF | | | INDICATION |
|---|---|---|---|
| 0 | 0 | 0 | FLAG SYNCHRONIZATION |
| 0 | 0 | 1 | ADDRESS AVAILABLE |
| 0 | 1 | 0 | DATA AVAILABLE |
| 0 | 1 | 1 | FRAME COMPLETED WITHOUT ERROR |
| 1 | 0 | 0 | ABORT DETECTED |
| 1 | 0 | 1 | IDLE DETECTED |
| 1 | 1 | 0 | PREEMPT DETECTED |
| 1 | 1 | 1 | FRAME COMPLETED WITH ERRORS |

METHOD AND APPARATUS FOR GRACEFUL PREEMPTION ON A DIGITAL COMMUNICATIONS LINK

CROSS-REFERENCE TO RELATED APPLICATION

This application is related to the application of M. W. Beckner and T. J. J. Starr, Ser. No. 453,929, filed Dec. 28, 1982, entitled, "Method and Apparatus for Bus Contention Resolution", which was filed concurrently herewith and assigned to the assignee of the present invention.

TECHNICAL FIELD

This invention relates to digital communications systems and, more particularly, to communications link controllers that allow preemptive access to a communications link on a priority basis.

BACKGROUND OF THE INVENTION

The rapid advances which have been made in semiconductor technology have permitted an increased reliance on computers to solve problems. Particularly as a result of the proliferation of small, inexpensive computers, such as microprocessors, the need for digital communication systems allowing a number of computers and computer peripherals to be interconnected in a computer communications network has become of increasing significance. One approach to this problem is to connect the various computer devices to a single communications link via data transmitters and data receivers. One system based on this approach is disclosed in U.S. Pat. No. 4,063,220 issued to R. M. Metcalfe et al. on Dec. 13, 1977. In that system one transmitter at a time is allowed to transmit data and part of the data transmitted defines the address of the destination receiver. Frequently the computers to be interconnected perform diverse functions such as bulk data transfer or signaling. It is undesirable to deny link access to a first computer used for relatively short duration signaling messages until a second computer has completed a bulk data transfer. Accordingly, some means is needed to provide preemptive access to the link on a priority basis.

To assure reliability a protocol or set of rules is typically imposed which governs communication over such a computer network data link. For example, data may be transmitted in variable length frames with predefined fields, and special characters and error check algorithms may be defined. Such protocols are typically implemented via link controllers. To implement error checking, a frame check sequence is derived and transmitted as part of each frame by a transmitting link controller. A receiving link controller then determines if the received frame check sequence is consistent with the rest of the received frame and generates error signals when appropriate. However, known link controllers derive the frame check sequence only over frames comprising a continuous sequence of bits. With such link controllers, a preemption occurring in the middle of a long frame, for example, results in the entire frame having to be retransmitted when access to the link is regained. Accordingly, a recognized problem in the art is providing preemptive access to a communications link on a priority basis without requiring data retransmission.

SUMMARY OF THE INVENTION

The aforementioned problem is advantageously solved and a technical advance is achieved in accordance with the principles of the invention is a method and apparatus for graceful preemption on a digital communications link whereby a preempted frame can be continued from the point of interruption after the transmission of the preempting frame.

In accordance with one aspect of the present invention, a first link controller includes a coupling arrangement which selectively couples a number of user devices to a communications medium for communication. The coupling arrangement has an associated first set of status variables which collectively define the present status of the coupling arrangement. When a selection arrangement selects a first user device while a second user device is coupled to the communications medium for communication, the first link controller interrupts the communication from the second user device and couples the first user device to the communications medium for communication. In addition, the values of the first set of status variables are saved. When the first user device has completed communication, the saved values of the first set of status variables are used to return the coupling arrangement to the status it had at the point of the interruption so that the second user device can resume communication from that point.

In accordance with a second aspect of the invention, a second link controller includes a receiver which receives communications from the communications medium. The receiver has an associated second set of status variables which collectively define the present status of the receiver. When a start preemption signal is received from the communications medium, the values of the second set of status variables are saved. Then when an end preemption signal is received from the communications medium, the receiver is returned to the status defined by the saved values of the second set of status variables. The reception of a preempted frame can thereafter be resumed from the point of interruption.

BRIEF DESCRIPTION OF THE DRAWING

A more complete understanding of the present invention may be obtained from a consideration of the following description when read in conjunction with the drawing in which.

GENERAL DESCRIPTION

Figure 1:
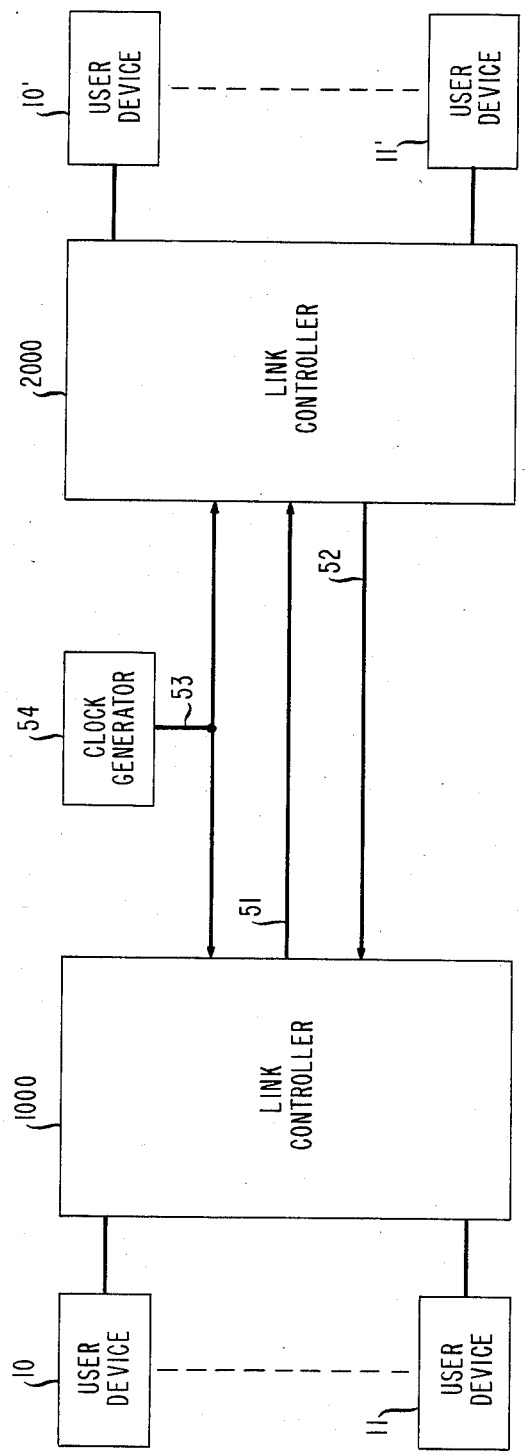
FIG. 1 is a block diagram of a communications system in accordance with the present invention.

FIG. 1 is a block diagram of a communications system in accordance with the present invention wherein a first plurality of user devices, e.g., 10 and 11, and a second plurality of user devices, e.g., 10' and 11', intercommunicate over a communications medium via a pair of link controllers 1000 and 2000. User devices 10, 11, 10' and 11' represent any of a wide variety of devices such as teleterminals, printers, alarms or computers. In FIG. 1, the communications medium is represented by a pair of unidirectional data links 51 and 52 and a clock generator 54 provides a clock signal to link controllers 1000 and 2000 via a clock line 53. The details of the communications medium are not relevant to the present invention and it is to be understood that data links 51 and 52 may be implemented using, for example, coaxial cable or telephone lines, and may include necessary drivers, receivers, modulation/demodulation equipment and switching systems.

Figure 2:
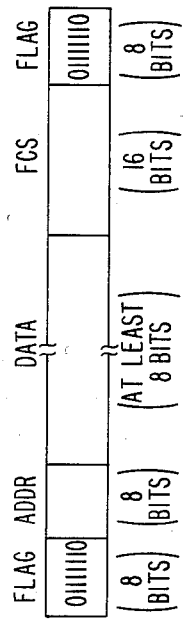
FIG. 2 is a diagram of the frame format used in the system of FIG. 1.

Data are transmitted over data links 51 or 52 in variable length frames in accordance with the predefined frame format shown in FIG. 2. The beginning of a frame is marked by an eight-bit FLAG character 01111110. Following the FLAG character is an eight-bit address field. In the present embodiment, communication is only possible between predetermined pairs of user devices, e.g., device 10 communicates with device 10' and device 11 communicates with device 11', and accordingly, only a single address is required to define both the source and destination of a given frame. However, more generally, the address field could include separate source and destination addresses and could include additional bits if required to define a large number of user devices. Following the address field is a variable length data field which contains the data to be communicated. In the present embodiment, the data field must include at least eight bits and may comprise predefined control and information fields, the details of which are not relevant herein. Following the data field is a 16-bit frame check sequence (FCS) field used for error checking. The end of the frame is marked by the FLAG character 01111110. Since the data field is of variable length, the location of the address field is defined with respect to the beginning FLAG of each frame and the location of the FCS field is defined with respect to the ending FLAG. Only a single FLAG character is needed to separate contiguous frames. The single FLAG serves both to mark the end of the first frame and the beginning of the second frame. In accordance with a well-known method for achieving data transparency, a dummy zero is inserted after every occurrence of five consecutive ones between the beginning FLAG and the ending FLAG to insure that the character 01111110 is not present therebetween. Received frames must therefore be subjected to zero deletion where any zero following five consecutive ones is deleted.

In accordance with the well-known error checking method of the present example, the 16-bit sequence inserted in the FCS field is the ones complement of the sum (modulo 2) of: (a) the remainder of $x^k$ $(x^{15}+x^{14}+x^{13}+ \ldots +x^2+x+1)$ divided (modulo 2) by the generator polynomial $x^{16}+x^{12}+x^5+1$, where k is the number of bits in the frame existing between, but not including, the final bit of the opening flag and the first bit of the FCS, excluding inserted dummy bits, and (b) the remainder after multiplication by $x^{16}$ and then division (modulo 2) by the generator polynomial $x^{16}+x^{12}+x^5+1$, of the content of the frame, existing between but not including, the final bit of the opening flag and the first bit of the FCS, excluding inserted dummy bits.

The function of link controllers 1000 and 2000 is to receive data from the user devices 10, 11, 10' and 11' and to insert that data along with a derived FCS field in the predefined FIG. 2 frame format transmitted on data links 51 and 52. In addition, link controllers 1000 and 2000 receive frames on data links 51 and 52, determine whether the received FCS fields are proper, and extract the data fields for transmission to user devices 10, 11, 10' and 11'. Link controllers 1000 and 2000 also allow a given user device to gracefully preempt the transmission from another user device on links 51 or 52 without requiring the preempted device to retransmit the entire frame. For example, assume that user device 10 is transmitting a lengthy frame to user device 10' over data link 51. After the opening flag, the address field and at least eight bits of the data field have been transmitted, link controller 1000 begins receiving data from user device 11 and, in response, determines based on stored information that user device 11 has a higher priority than user device 10. Link controller 1000 selects user device 11 as the user device to be coupled to data link 51, rather than user device 10. Link controller 1000 then saves the values of a first set of status variables which collectively define the present status of link controller 1000 and transmits a PREEMPT character 11111110 (FIG. 3) followed by a complete frame including the data from user device 11. After the closing flag of the preempting frame has been transmitted, the saved values of the first set of status variables are used to return link controller 1000 to its status at the point the preempted frame was interrupted and the balance of the preempted frame from user device 10 is then transmitted. The FCS field of the preempted frame from user device 10 is derived from the entire frame, rather than only the portion transmitted after the preempting frame.

Figure 3:
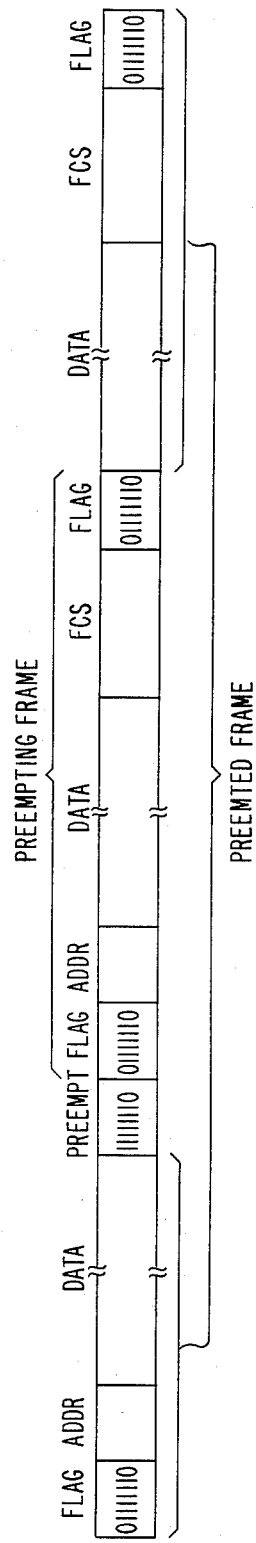
FIG. 3 is a diagram illustrating the graceful preemption of a frame in the system of FIG. 1.

Upon detecting the PREEMPT character, link controller 2000 saves the values of a second set of status variables which collectively define the present status of link controller 2000. Link controller 2000 then receives the preempting frame, determines whether the FCS field is proper and transfers the data field to user device 11'. When the closing flag of the preempting frame is received, the saved values of the second set of status variables are used to return link controller 2000 to its status at the time the PREEMPT character was detected and the balance of the preempted frame is then received. Link controller 2000 then determines whether the FCS field can be properly derived from the entire preempted frame. Although FIG. 3 illustrates only a single preemption, multiple preemptions, i.e., preemptions within preemptions, are also possible.

Link controller 1000 can also terminate the transmission of a frame on link 51 by transmitting an ABORT character 11111111. However in that case, no status variables are saved and the interrupted frame must be retransmitted in its entirety. During the transmission of a frame, link controller 1000 maintains a count of the number of consecutive logic ones transmitted. If, for example, after the transmission of three consecutive logic ones on link 51, link controller 1000 determines that a preemption is required, it transmits four additional logic ones followed by a logic zero to complete the PREEMPT character 11111110. Then after the preempting frame has been transmitted, link controller 1000 resumes the transmission of the preempted frame by transmitting three consecutive logic ones.

Functional Description

Figure 4:
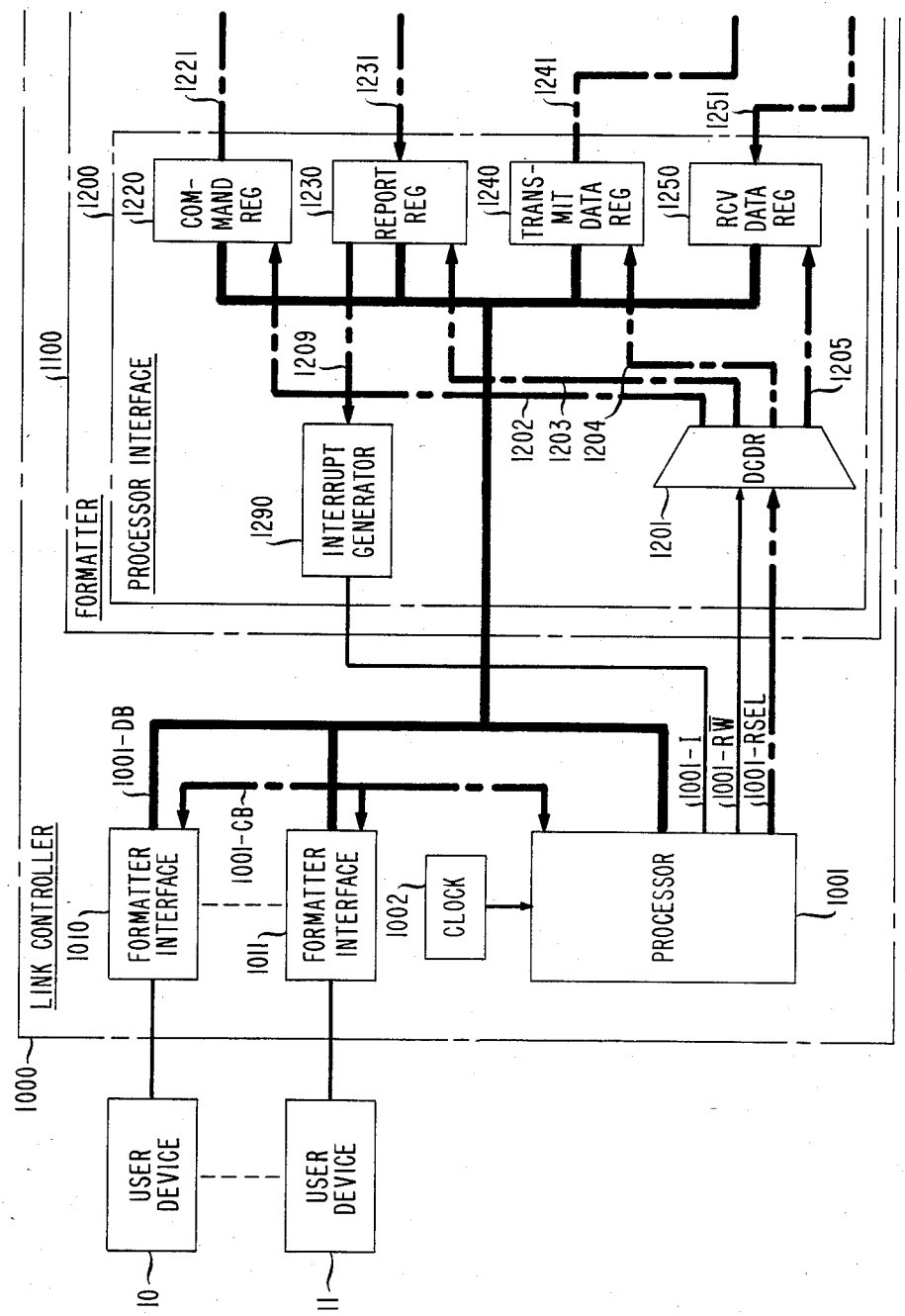
FIGS. 4 and 5 when arranged in accordance with FIG. 6 present a detailed diagram of a first link controller included in the system of FIG. 1.
Figure 5:
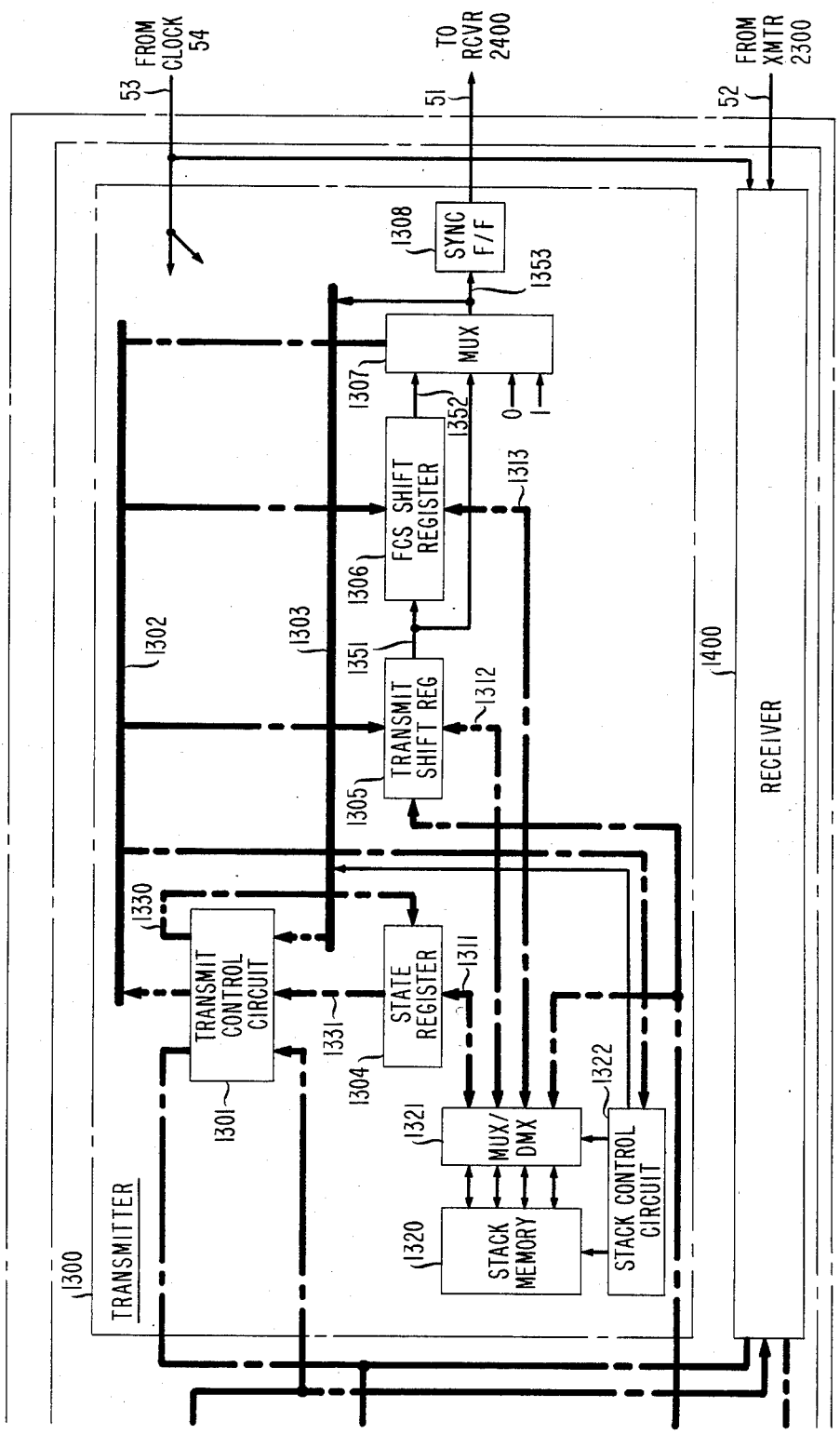
Figure 7:
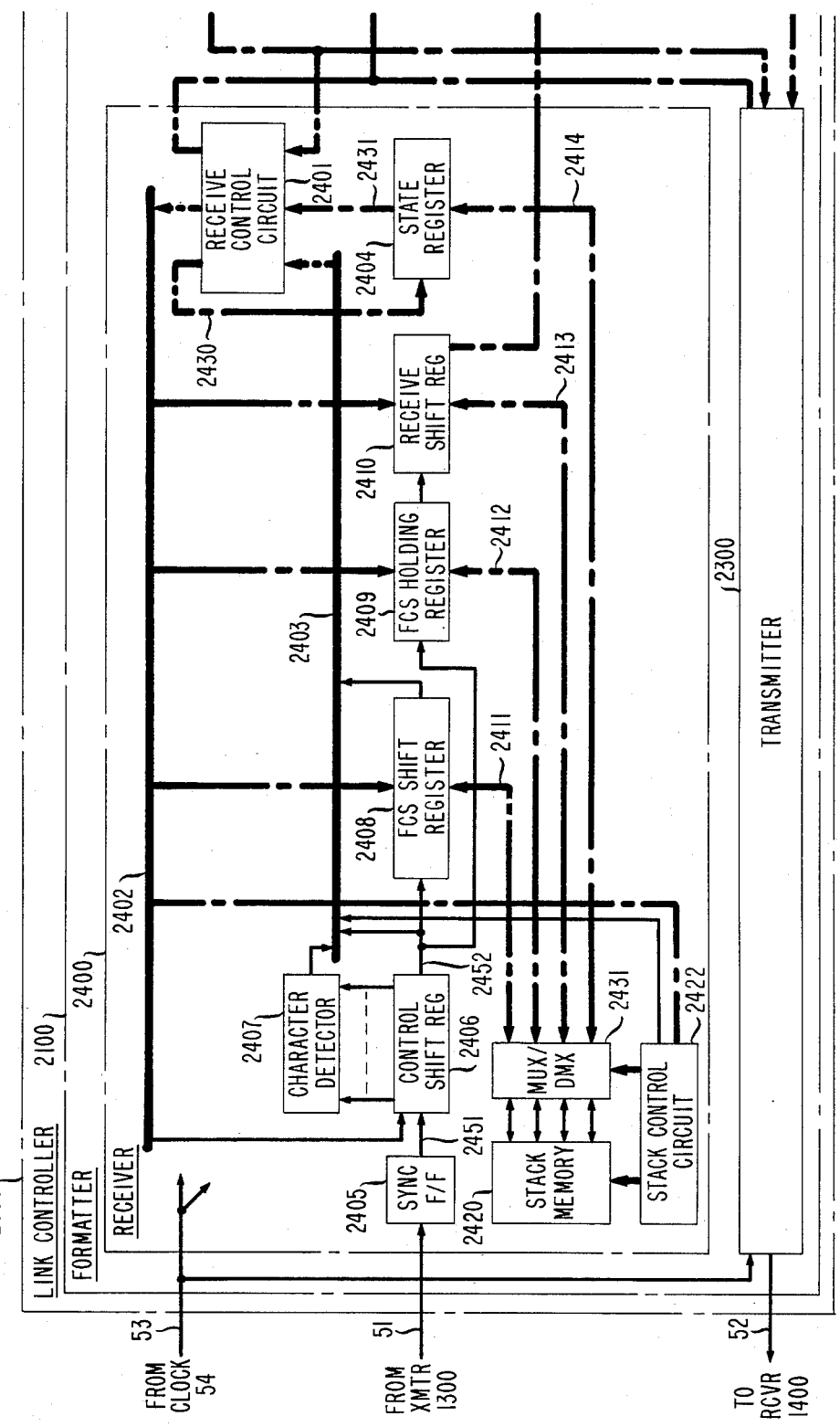
FIGS. 7 and 8 when arranged in accordance with FIG. 9 present a detailed diagram of a second link controller included in the system of FIG. 1.
Figure 8:
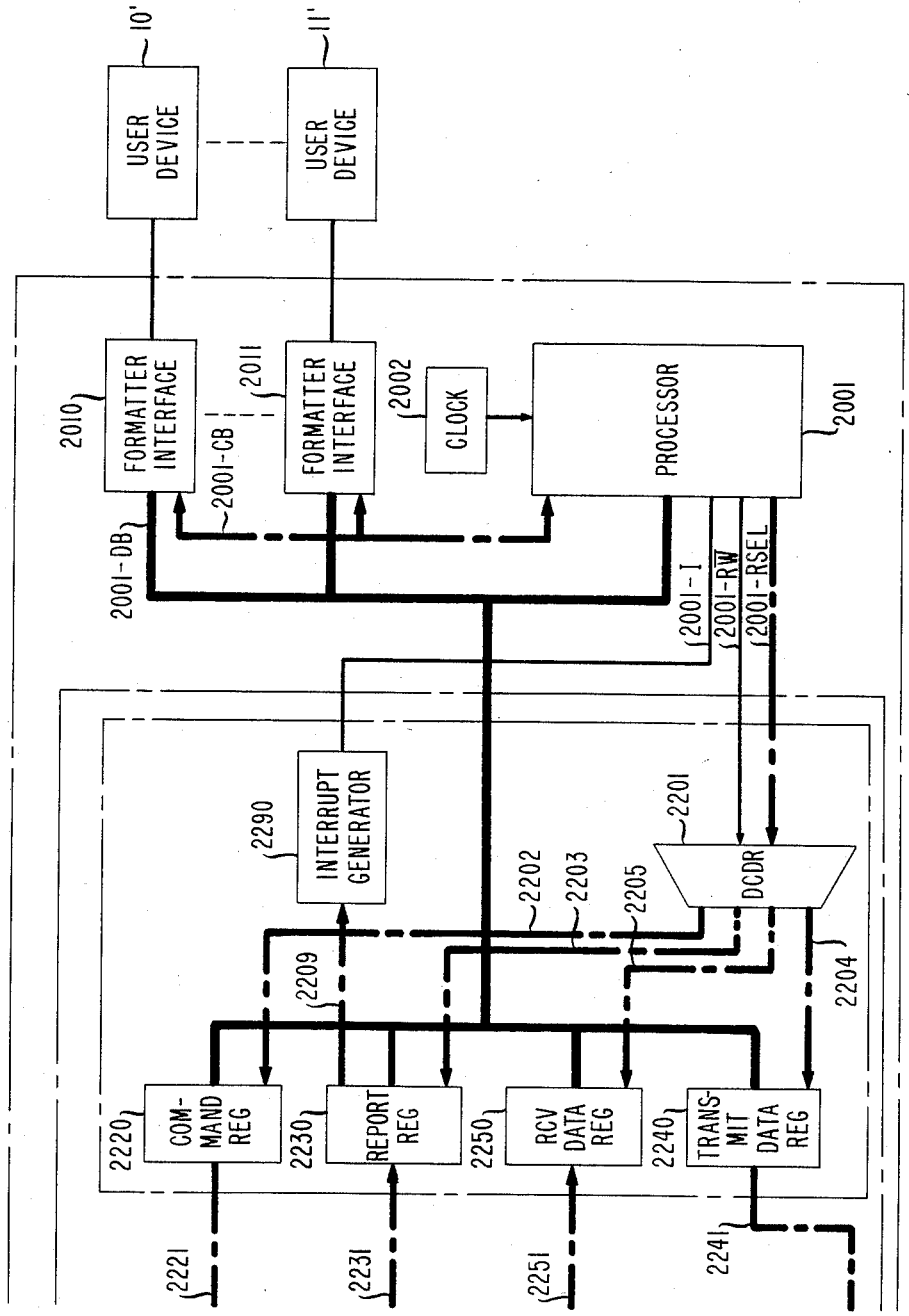

Link controller 1000, shown in detail in FIGS. 4 and 5 arranged in accordance with FIG. 6, comprises a plurality of formatter interfaces, e.g., formatter interfaces 1010 and 1011 connected to user devices 10 and 11, respectively, a processor 1001, e.g., the Motorola 6809, and its associated clock 1002 and a formatter 1100 including a processor interface 1200, a transmitter 1300 connected to data link 51 and a receiver 1400 connected to data link 52. Link controller 2000, shown in detail in FIGS. 7 and 8 arranged in accordance with FIG. 9 and which comprises a plurality of formatter interfaces, e.g., formatter interfaces 2010 and 2011 connected to user devices 10′ and 11′, respectively, a processor 2001 and its associated clock 2002 and a formatter 2100 including a processor interface 2200, a transmitter 2300 and a receiver 2400, is substantially identical to link controller 1000. The numerical designations of corresponding parts of link controllers 1000 and 2000 differ by 1000. For example, transmitter 1300 and transmitter 2300 are substantially identical.

Figure 10:
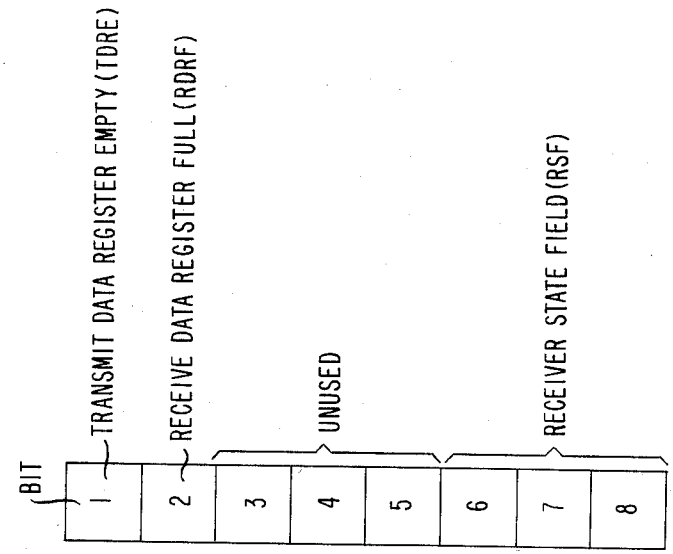
FIGS. 10 and 11 are bit assignment tables for registers included in the link controllers of FIGS. 4 and 5 and for registers included in the link controller of FIGS. 7 and 8.
Figure 11:
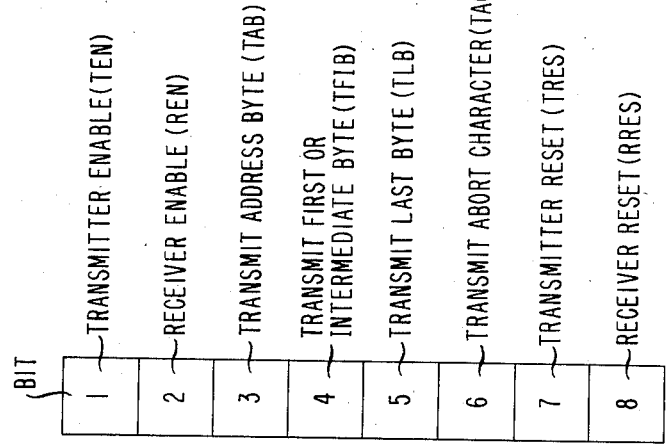

Processor 1001 controls the operation of transmitter 1300 and receiver 1400 by writing various predefined bits into a command register 1220 of processor interface 1200. The bit assignments for register 1220 are shown in FIG. 10. Processor 1001 learns of the occurrence of certain events or states within transmitter 1300 by reading predefined bits in a report register 1230. The bit assignments for register 1230 are shown in FIG. 11. Processor 1001 and formatter interfaces 1010 and 1011, under the control of processor 1001, convey data to transmitter 1300 to be transmitted on link 51, by writing eight-bit bytes of information in a transmit data register 1240. Further, data received by receiver 1400 on data link 52 is conveyed to processor 1001 or formatter interfaces 1010 and 1011 in eight-bit bytes via a receive data register 1250.

Operations within transmitter 1300 are controlled by a transmit control circuit 1301. Circuit 1301 includes a controller (not shown) which advantageously can be implemented as either a programmable logic array or a processor. The state diagram for transmit control circuit 1301 is given in FIG. 12. Transmit control circuit 1301 controls the enabling and shifting of an eight-bit transmit shift register 1305 and a 16-bit FCS shift register 1306 via a control bus 1302. A multiplexer 1307, also controlled by transmit control circuit 1301 via control bus 1302, selects bits from transmit shift register 1305 or FCS shift register 1306 or predefined logic zero or one bits for transmission on data link 51. For example, transmit control circuit 1301 can effect the transmission of the FLAG character 01111110 on link 51 by transmitting signals to multiplexer 1307 such that multiplexer 1307 selects first a logic zero bit, then six consecutive logic one bits and finally a logic zero bit for transmission on link 51. The information comprising the address field and the data field is conveyed from transmit data register 1240 in parallel to transmit shift register 1305 in eight-bit bytes and then is shifted serially via a conductor 1351 and multiplexer 1307 onto data link 51. The bits transmitted from transmit shift register 1305 on conductor 1351 also enter FCS shift register 1306 which operates sequentially to generate the 16-bit FCS field described above. The operation of FCS shift register 1306 is such that at any given time it contains the FCS field derived from all bits of the frame which have been transmitted by transmit shift register 1305 up to that time. FCS shift register 1306 is described in detail later herein. When transmit control circuit 1301 determines that the last byte of the data field has been transmitted on link 51, it effects the transmission of the FCS field by FCS shift register 1306 via a conductor 1352 and multiplexer 1307. Transmit control circuit 1301 monitors via a report bus 1303 the bits transmitted by multiplexer 1307 and maintains an internal status variable defining the number, $N_2$, of consecutive logic ones transmitted. Whenever five consecutive logic ones have been transmitted, circuit 1301 effects the transmission by multiplexer 1307 of a dummy logic zero bit. This internal status variable defining $N_2$ is also used to transmit the PREEMPT character 11111110 as described above. Since multiplexer 1307 transmits the PREEMPT, ABORT and FLAG characters under the control of transmit control circuit 1301 rather than by conveying bits transmitted by transmit shift register 1305 or FCS shift register 1306, no dummy logic zero bits are inserted in those characters. The shifting operation of transmit shift register 1305 and FCS shift register 1306 is disabled for one bit period as multiplexer 1307 transmits a dummy logic zero bit. Transmit control circuit 1301 also maintains a second internal status variable defining the number, $N_1$, of bits of a given byte stored in transmit shift register 1305 that have been shifted out at any given time. When transmit control circuit 1301 determines that a preemption is to occur, it stores the values of the two above-mentioned status variables in a state register 1304. The contents of transmit data register 1240, state register 1304, transmit shift register 1305 and FCS shift register 1306, which contents are referred to collectively herein as a first set of status variables, are then saved in a stack memory 1320, e.g., the Fairchild 4706B. Since each location in memory 1320 is four bits wide, the bits comprising the first set of status variables are saved in predefined memory 1320 locations via a multiplexer/demultiplexer 1321 under the control of a stack control circuit 1322. When transmit control circuit 1301 determines that the transmission of a preempting frame has been completed, it effects a transmission of the saved values of the set of status variables from stack memory 1320 to the appropriate bit positions of transmit data register 1240, state register 1304, transmit shift register 1305 and FCS shift register 1306 for storage therein and the transmission of the preempted frame can resume from the point of interruption. Transmit control circuit 1301 uses the saved value of the status variable defining the number, $N_2$, of consecutive logic one bits transmitted by multiplexer 1307 at the time of preemption to resume the transmission of the preempted frame by controlling the transmission by multiplexer 1307 of $N_2$ consecutive logic one bits. Transmit control circuit 1301 also uses the saved value of the variable defining $N_2$ to resume its dummy zero insertion function with respect to the preempted frame and, if required, to complete the transmission of a PREEMPT character. Transmit control circuit 1301 uses the saved value of the status variable defining the number, $N_1$, of bits of a given byte that have been shifted out by transmit shift register 1305 to effect the proper transmission of the remainder of the given byte after the preempting frame is completed. Recall that multiple levels of preemption are allowed. For each preemption, one value of each of the above-described first set of status variables is saved in stack memory 1320. As preempting frames are completed, the saved values are recalled from stack memory 1320 in a last-in, first-out order.

Processor 2001 in link controller 2000 interacts with formatter interfaces 2010 and 2011 and with transmitter 2300 and receiver 2400 via command register 2220, report register 2230, receive data register 2250 and transmit data register 2240 just as processor 1001 interacts with formatter interfaces 1010 and 1011 and with transmitter 1300 and receiver 1400 via command register 1220, report register 1230, receive data register 1250 and transmit data register 1240 within link controllers 1000.

Operations within receiver 2400 are controlled by a receive control circuit 2401. Circuit 2401 includes a controller (not shown) which advantageously can be implemented as either a programmable logic array or a processor. The state diagram for receive control circuit 2401 is given in FIG. 13. Receive control circuit 2401 controls the enabling and shifting of an eight-bit control shift register 2406, a 16-bit FCS shift register 2408, a 16-bit FCS holding register 2409 and an eight-bit receive shift register 2410 via a control bus 2402. A character detector 2407 detects the presence of the FLAG character 01111110, the ABORT character 11111111 or the PREEMPT character 11111110 in control shift register 2406 and informs receive control circuit 2401 of such detection via a report bus 2403. In response, receive control circuit 2401 effects the shifting of eight subsequent bits from link 51 into control shift register 2406. However, the bits comprising the FLAG, ABORT or PREEMPT character are not shifted into registers 2408, 2409 and 2410. Receive control circuit 2401 monitors via report bus 2403 the bit stream transmitted by control shift register 2406 and maintains an internal status variable defining the number, $N_4$, of consecutive logic one bits transmitted by control shift register 2406. When the variable defining $N_4$ indicates that five consecutive logic one bits have been transmitted by control shift register 2406, receive control circuit 2401 effects the operation of registers 2408, 2409 and 2410 such that the dummy zero bit which follows five consecutive logic one bits is not shifted into those registers 2408, 2409 and 2410. The bits transmitted by control shift register 2406 are first shifted into FCS holding register 2409 via conductor 2452 and then into receive shift register 2410 via conductor 2453. Eight-bit bytes of data are then conveyed from receive shift register 2410 in parallel via a path 2251 to receive data register 2250 where they are then read by processor 2001 or by formatter interfaces 2010 or 2011, under the control of processor 2001. Receive control circuit 2401 maintains another internal status variable defining the number, $N_3$, of bits received by receive shift register 2410 since a byte was last transferred to receive data register 2250. The bits transmitted by control shift register 2406 also enter FCS shift register 2408 which sequentially generates the above-described 16-bit FCS field therefrom. FCS shift register 2408 is described in detail later herein. When character detector 2407 detects the closing flag of a frame, the FCS field of that frame has already been shifted into both FCS shift register 2408 and FCS holding register 2409. FCS holding register 2409 is included in receiver 2400 so that the frame FCS field is not transferred to receive data register 2250. The FCS field generated by FCS shift register 2408 is compared with a constant field to determine whether the received frame contained errors and the result is conveyed to receive control circuit 2401 via report bus 2403. Receive control circuit 2401 informs processor 2001 of such information concerning receiver 2400 by writing a three-bit Receiver State Field (RSF) in report register 2230 (FIG. 11).

When character detector 2407 detects the presence of the PREEMPT character 11111110 in control shift register 2406, it so informs receive control circuit 2401 via report bus 2403. In response, receive control circuit 2401 transmits the present values of its internal status variables defining $N_3$ and $N_4$ to a state register 2404. Receive control circuit 2401 then effects a transmission of the contents of state register 2404, receive shift register 2410, FCS holding register 2409 and FCS shift register 2408, which contents are collectively referred to herein as a second set of status variables, to a stack memory 2420 via a multiplexer/demultiplexer 2421. The operation of stack memory 2420, multiplexer/demultiplexer 2421 and a stack control circuit 2422 in saving values of the second set of status variables is substantially identical to the operation of stack memory 1320, multiplexer/demultiplexer 1321 and stack control circuit 1322 of transmitter 1300 in saving values of the first set of status variables. When character detector 2407 detects the closing flag of the preempting frame, the values of the second set of status variables, which values are saved in stack memory 2420, are transmitted via multiplexer/demultiplexer 2421 to predefined bit positions in registers 2404, 2410, 2409 and 2408. Receive control circuit 2401 reads the contents of state register 2404 via a path 2431 to return its internal status variables to the values they had at the point of graceful preemption. After character detector 2407 detects the closing flag of the preempting frame, the next eight bits received from data link 51 are shifted into control shift register 2406. Receive control circuit 2401 uses the value of its internal status variable defining the number, $N_4$, of consecutive logic one bits that had been transmitted by control shift register 2406 to resume its zero deletion function with respect to the preempted frame exactly where it was interrupted by the graceful preemption. Receive control circuit 2401 uses the value of its internal status variable defining the number, $N_3$, of bits which had been shifted into receive shift register 2410 to determine when a complete eight-bit byte is available to be transferred to receive data register 2250. The reception of the balance of the preempted frame can then continue in the above-described manner.

Detailed Description

The operation of link controllers 1000 and 2000 will be described in greater detail with reference to two examples—the first having a single frame (FIG. 2) being transmitted from user device 10 to user device 10' via data link 51 and the second having user device 11 gracefully preempt the transmission from user device 10

(FIG. 3). Accordingly the description of link controller 1000 will emphasize those aspects involved in transmitting data on link 51 and the description of link controller 2000, those aspects involved in receiving data on link 51.

Processor 1001 of link controller 1000 is connected to formatter interfaces 1010 and 1011 and to command register 1220, report register 1230, transmit data register 1240 and receive data register 1250 of processor interface 1200 by an eight-conductor, bidirectional data bus 1001-DB. Processor 1001 can control the reading of the contents of a given one of the registers 1220, 1230, 1240 and 1250 by transmitting to a decoder 1201 a logic one signal on a conductor 1001-RW and register select signals defining the given register on a path 1001-RSEL. Decoder 1201, in turn, transmits a signal on the appropriate one of four paths 1202, 1203, 1204 and 1205 to the given register. In response, the contents of the given register are made available for reading on data bus 1001-DB by processor 1001 or formatter interfaces 1010 or 1011. Processor 1001 also controls the writing of registers 1220, 1230, 1240 and 1250. When processor 1001 transmits to decoder 1201 a logic zero signal on conductor 1001-RW and register select signals defining a given register on path 1001-RSEL, decoder 1201 transmits a signal on the appropriate one of the paths 1202, 1203, 1204 and 1205 to the given register. A byte or portion thereof transmitted by processor 1001 or formatter interfaces 1010 or 1011 on data bus 1001-DB is then stored in the given register.

Figure 12:
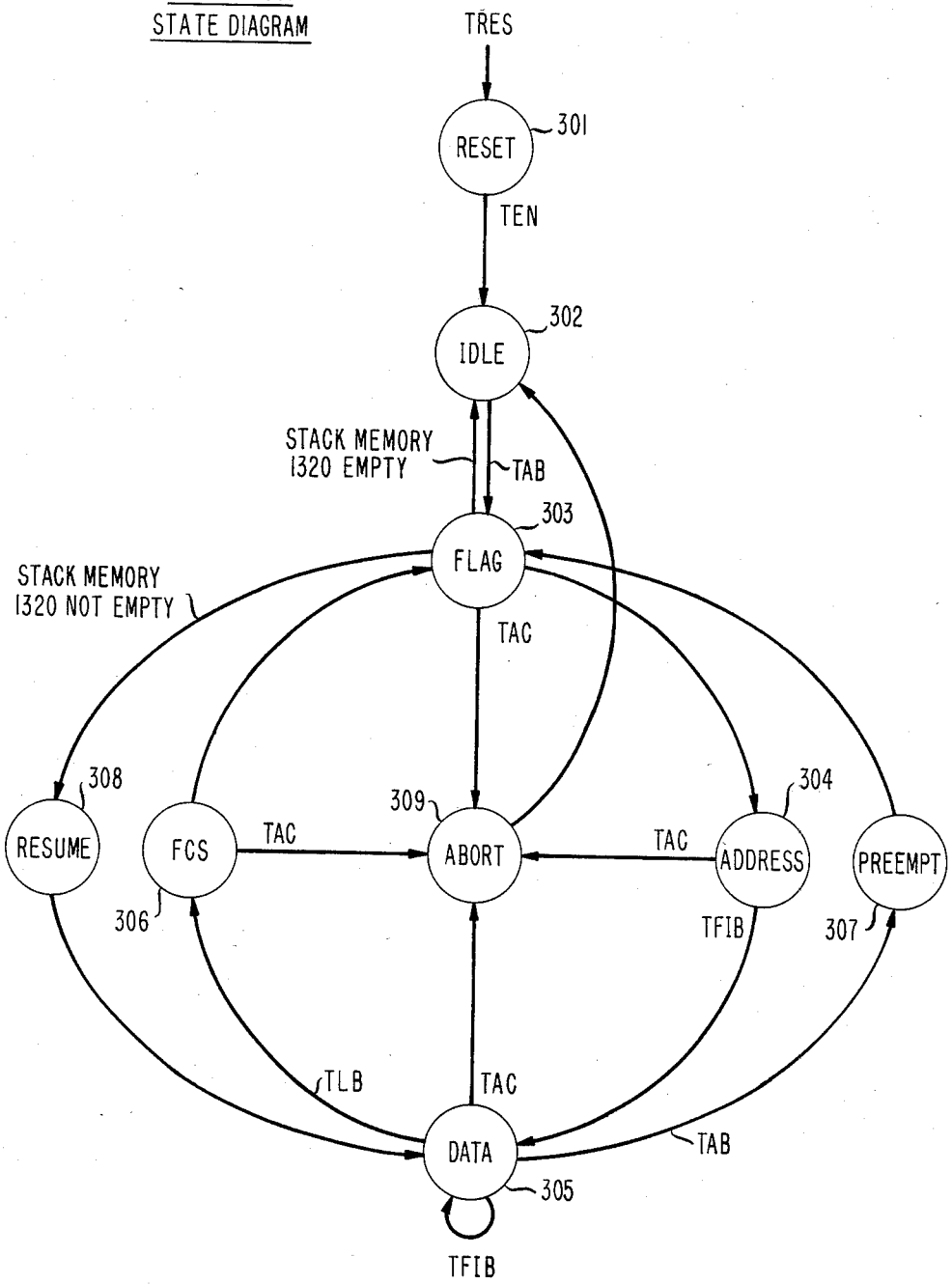
FIG. 12 is a state diagram relevant to a circuit included in the link controller of FIGS. 4 and 5.

To initialize transmitter 1300 and data link 51, processor 1001 writes a logic one Transmitter Reset (TRES) bit in command register 1220 (FIG. 10). Transmit control circuit 1301 included in transmitter 1300 detects the TRES bit via a path 1221 and, in response, enters a RESET state 301 (FIG. 12). A logic zero TRES bit is subsequently written in command register 1220 by processor 1001. (All commands from processor 1001 to transmit control circuit 1301 are conveyed by processor 1001 writing a logic one bit in command register 1220 and, after allowing sufficient time for that logic one bit to be detected by transmit control circuit 1301, then writing a logic zero bit in that command register 1220 bit position.) In the RESET state 301, transmit control circuit 1301 monitors a Transmitter Enable (TEN) bit in command register 1220 (FIG. 10) via path 1221. When processor 1001 writes a logic one TEN bit in command register 1220 to enable transmitter 1300 and such TEN bit is detected by circuit 1301, circuit 1301 enters an IDLE state 302 (FIG. 12). In IDLE state 302, circuit 1301 transmits signals to multiplexer 1307 via control bus 1302 such that multiplexer 1307 repetitively transmits logic one bits to data link 51 via a conductor 1353 and a D-type sync flip-flop 1308. Sync flip-flop 1308 assures that the signals transmitted on link 51 do not change during each one-bit time interval. Flip-flop 1308 stores bits at its output terminal connected to link 51 on a positive edge of the clock signal transmitted by clock generator 54. In IDLE state 302, circuit 1301 monitors a Transmit Address Byte (TAB) bit in command register 1220 (FIG. 10) via path 1221. In accordance with the first example (FIG. 2), user device 10 begins transmitting data to formatter interface 1010, which temporarily stores such data, as required, in a buffer memory (not shown). In the present exemplary embodiment, the formatter interface 1010 buffer memory has sufficient capacity to store the entire data field of the maximum length frame transmitted on data link 51. Formatter interface 1010 informs processor 1001 via a control bus 1001-CB of its desire to transmit data to data link 51. Processor 1001 determines based on stored information that link 51 is presently idle and writes a logic one TAB bit in command register 1220 and an address byte, which in the present embodiment defines user device 10' as the destination for the frame, in transmit data register 1240. Transmit control circuit 1301 detects the TAB bit and, in response, enters a FLAG state 303 (FIG. 12). In FLAG state 303, circuit 1301 transmits signals to multiplexer 1307 via control bus 1302 such that multiplexer 1307 transmits the FLAG character 01111110 to data link 51. Circuit 1301 also transmits a signal to FCS shift register 1306, and, in response, register 1306 is initialized to have an FCS field of 16 logic one bits. Further, circuit 1301 transmits a signal to transmit shift register 1305, which, in response, reads the address byte from transmit data register 1240 via parallel path 1241. Once the address byte has been conveyed from register 1240 to register 1305, transmit control circuit 1301 writes a logic one Transmit Data Register Empty (TDRE) bit in report register 1230 (FIG. 11) via a path 1231 and enters an ADDRESS state 304 (FIG. 12). In the ADDRESS state 304, circuit 1301 transmits signals via control bus 1302 to transmit shift register 1305 and multiplexer 1307 such that the address byte is serially transmitted from transmit shift register 1305 via a conductor 1351, multiplexer 1307, conductor 1353 and sync flip-flop 1308 to data link 51. Circuit 1301 also transmits a signal via control bus 1302 to FCS shift register 1306 such that the address byte transmitted by transmit shift register 1305 on conductor 1351 is also shifted into FCS shift register 1306. Circuit 1301 monitors the bit stream transmitted on conductor 1353 via report bus 1303 and maintains an internal status variable defining the number, $N_2$, of consecutive logic one bits transmitted. When the status variable defining $N_2$ indicates that five consecutive logic one bits have been transmitted, circuit 1301 interrupts the shifting of bits into transmit shift register 1305 and FCS shift register 1306 and effects a transmission of a dummy logic zero bit by multiplexer 1307. While in the ADDRESS state 304, circuit 1301 monitors a Transmit First or Intermediate Byte (TFIB) bit in command register 1220 via path 1221.

Recall that transmit control circuit 1301 stored a logic one TDRE bit in report register 1230 indicating that the contents of transmit data register 1240 had been stored in transmit shift register 1305. The TDRE bit is monitored via a path 1209 by an interrupt generator 1290, which, in response to the storing of the logic one TDRE bit, transmits an interrupt signal to processor 1001 via a conductor 1001-I. In response to the interrupt signal, processor 1001 transmits a signal via control bus 1001-CB to formatter interface 1010 resulting in the transmission of the first data byte from formatter interface 1010 via data bus 1001-DB to transmit data register 1240. Processor 1001 then writes a logic one TFIB bit in command register 1220, and in response thereto, transmit control circuit 1301 enters a DATA state 305 (FIG. 12). In the DATA state 305, transmit control circuit 1301 controls the storage by transmit shift register 1305 of the first data byte from transmit data register 1240 and the subsequent transmission of that byte to FCS shift register 1306 and also via multiplexer 1307 to data link 51. Circuit 1301 again writes a logic one TDRE bit in report register 1230 and, in response thereto, interrupt generator 1290 transmits an interrupt signal to processor 1001. Processor 1001 effects a transmission of the second data byte from formatter interface 1010 to transmit data register 1240 and again writes a logic one TFIB bit in command register 1220. In response to the logic one TFIB bit, circuit 1301 remains in the DATA state 305 and controls the transmission of the second data byte into FCS shift register 1306 and also to data link 51. While in the DATA state 305, circuit 1301 monitors the TFIB and TAB bits and, in addition a Transmit Last Byte (TLB) bit in command register 1220 (FIG. 10). The process repeats and all intermediate bytes are transmitted from formatter interface 1010 onto data link 51. When formatter interface 1010 determines that the last data byte of the frame is available, it signals processor 1001 by transmitting a signal referred to herein as a completion signal, via control bus 1001-CB and after that byte is written in transmit data register 1240, processor 1001 writes a logic one TLB bit in command register 1220. The writing of the logic one TLB bit in transmit data register 1240 is also referred to herein as transmitting an end signal. In response to the logic one TLB bit, circuit 1301 enters an FCS state 306 (FIG. 12) wherein the last data byte is transmitted onto data link 51 and the 16-bit contents of FCS shift register 1306 are serially transmitted via multiplexer 1307 onto data link 51 immediately thereafter. Circuit 1301 then enters the FLAG state 303, controls the transmission by multiplexer 1307 of one FLAG character 01111110 onto link 51 and then returns to the IDLE state 302, wherein multiplexer 1307 repetitively transmits logic one bits on link 51. Transmit control circuit 1301 returns from the FLAG state 303 to the IDLE state 302 rather than the ADDRESS state 304 since it had entered the FLAG state 303 from the FCS state 306 rather than the IDLE state 302. This completes the transmission of one frame from user device 10 (FIG. 2). If during the transmission of the frame while circuit 1301 was in the FLAG state 303, the ADDRESS state 304, the DATA state 305 or the FCS state 306, processor 1001 had determined that the frame should be aborted, it would have written a logic one Transmit Abort Character (TAC) bit in command register 1220 (FIG. 10) and circuit 1301, in response, would have entered an ABORT state 309 (FIG. 12). In the ABORT state 309, circuit 1301 effects the transmission by multiplexer 1307 of the ABORT character 11111111 onto data link 51, clears stack memory 1320 and reenters the IDLE state 302.

In accordance with the second example (FIG. 3), after the transmission on data link 51 of the opening flag, the address field and at least eight bits of the data field of the frame from user device 10, user device 11 begins transmitting data to formatter interface 1011. Transmit control circuit 1301 is in the DATA state 305. Upon receiving data from user device 11, formatter interface 1011 informs processor 1001 via control bus 1001-CB of its desire to transmit data on data link 51. In response, processor 1001 determines based on stored information that user device 10 is presently transmitting a frame on link 51, but that user device 11 has priority with respect to user device 10 and that accordingly the user device 10 frame is to be gracefully preempted. Processor 1001 first writes a logic one TAB bit into command register 1220. In response to the TAB bit, transmit control circuit 1301 enters a PREEMPT state 307 (FIG. 12). Recall that transmit control circuit 1301 maintains two internal status variables, one defining the number, $N_2$, of consecutive logic ones transmitted by multiplexer 1307 and the other defining the number, $N_1$, of bits of a given byte which have been shifted out of transmit shift register 1305. Upon entering the PREEMPT state 307, circuit 1301 stores the present values of the internal status variables defining $N_2$ and $N_1$ in state register 1304 via a path 1330. Then the contents of transmit data register 1240, state register 1304, transmit shift register 1305, and FCS shift register 1306, which contents are collectively referred to as the above-mentioned first set of status variables, are conveyed via paths 1241, 1311, 1312, and 1313, respectively, and via multiplexer/demultiplexer 1321 to be saved in stack memory 1320. The sequential transmission of bits by multiplexer/demultiplexer 1321 to predefined locations of stack memory 1320 is controlled by stack control circuit 1322, which in turn is controlled by transmit control circuit 1301 via control bus 1302.

Once the contents of transmit data register 1240 have been saved in stack memory 1320, transmit control circuit 1301 writes a logic one TDRE bit into report register 1230. In response, processor 1001 writes an address byte, which in the present embodiment defines user device 11' as a destination of the frame from user device 11, into transmit data register 1240. Transmit control circuit 1301 clears transmit shift register 1305, reinitializes register 1306 to have an FCS field of 16 logic one bits and then uses the internal status variable defining the number, $N_2$, of consecutive ones transmitted on link 52 to effect the transmission by multiplexer 1307 of the PREEMPT character 11111110, also referred to herein as a start preemption signal. For example, if three consecutive logic one bits had already been transmitted by multiplexer 1307, the PREEMPT character would be completed by transmitting four consecutive logic one bits followed by a logic zero bit. Transmit control circuit 1301 then resets the internal status variables defining $N_1$ and $N_2$ to zero. Transmit control circuit 1301 returns to the FLAG state 303 and subsequently enters the ADDRESS state 304, the DATA state 305, the FCS state 306 and again the FLAG state 303 as the entire preempting frame from user device 11 is transmitted in the above-described manner. Stack control circuit 1322 stores a bit indicating whether stack memory 1320 is empty and transmit control circuit 1301 monitors this bit via report bus 1303. Once the closing flag of the preempting frame, which flag is also referred to herein as an end preemption signal, has been transmitted, transmit control circuit 1301 determines based on the stored stack control circuit 1322 bit that stack memory 1320 is not empty and based on this determination enters a RESUME state 306 (FIG. 12). In the RESUME state 306, transmit control circuit 1301 effects the transmission by multiplexer/demultiplexer 1321 of the saved values of the first set of status variables in stack memory 1320 to the predefined bit positions of transmit data register 1240, state register 1304, transmit shift register 1305 and FCS shift register 1306 via paths 1241, 1311, 1312 and 1313, respectively. Transmit control circuit 1301 reads the contents of state register 1304 via a path 1331 such that its two internal status variables defining the number, $N_2$, of consecutive ones transmitted on link 51 and the number, $N_1$, of bits of a byte that have been shifted by transmit shift register 1305 can be restored to their values at the point of graceful preemption. Then transmit control circuit 1301 controls the transmission of $N_2$ consecutive logic one bits by multiplexer 1307 to replace the logic one bits which were included in the previously transmitted PREEMPT character 11111110. Transmit control circuit 1301 returns to the DATA state 305 and the number of bits in transmit shift register 1305 which were not transmitted prior to preemption are now shifted out via multiplexer 1307 onto data link 51. Formatter interface 1010 can now resume transferring bytes to transmit data register 1240 and the balance of the preempted frame from user device 10 can be transmitted on data link 51 in the above-described manner.

Figures 13, 14:
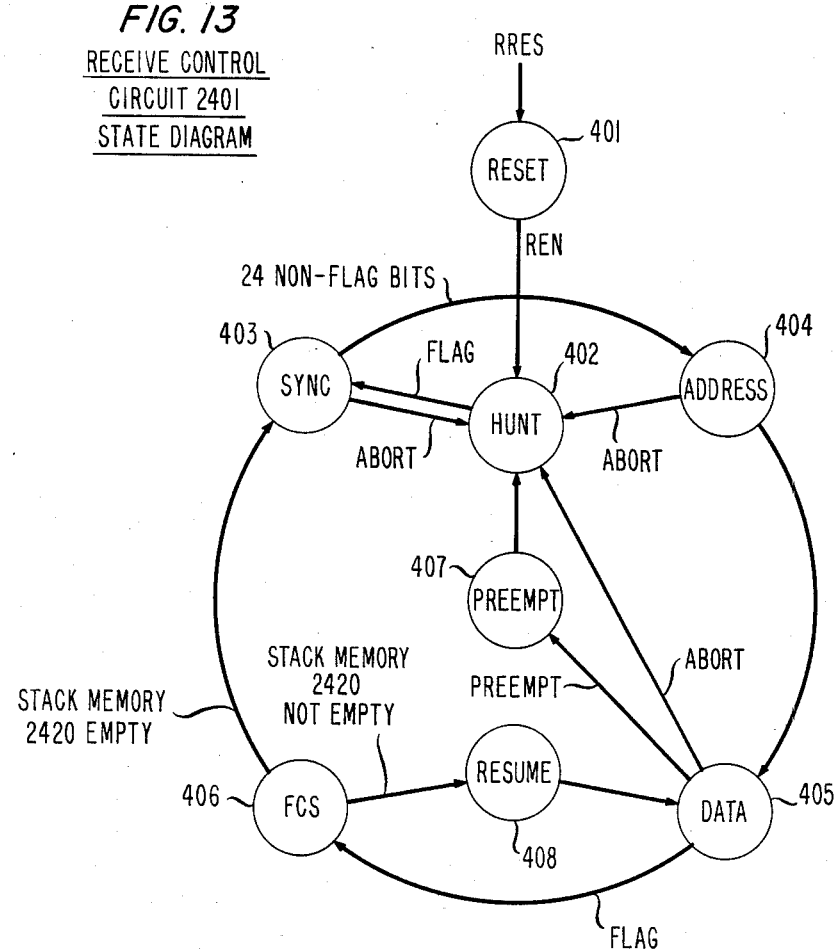
FIG. 13 is a state diagram relevant to a circuit included in the link controller of FIGS. 7 and 8.
FIG. 14 is a table defining the encoding of a receiver state field used in the link controller of FIGS. 4 and 5 and in the link controller of FIGS. 7 and 8.

The operation of link controller 2000 in receiving data on link 51 will now be described in greater detail with reference to the above examples of FIG. 2 and 3. To initiate operation, processor 2001 resets receiver 2400 by writing a logic one Receiver Reset (RRES) bit in command register 2220 (FIG. 10) of processor interface 2200 and receive control circuit 2401, upon detecting such RRES bit via a path 2221, enters a RESET state 401 (FIG. 13). In the RESET state 401, receive control circuit 2401 monitors a Receiver Enable (REN) bit in command register 2220 via path 2221. When processor 2001 writes a logic one REN bit in command register 2220 to enable receiver 2400, receive control circuit 2401 detects such REN bit and enters a HUNT state 402 (FIG. 13). Each bit received on data link 51 is transmitted via a D-type sync flip-flop 2405 and a conductor 2451 to an eight-bit control shift register 2406. Sync flip-flop 2405 assures that link 51 is sampled at the appropriate time. Flip-flop 2405 stores bits at its output terminal connected to conductor 2451 on the negative edge of the clock signal transmitted by clock generator 54. Character detector 2407 monitors the contents of control shift register 2406 for the presence of the FLAG character 01111110, the ABORT character 11111111 or the PREEMPT character 11111110 and when such character is detected so informs receive control circuit 2401 via report bus 2403. When, in accordance with the example of FIG. 2, the opening flag is detected in control shift register 2406 by character detector 2407, receive control circuit 2401 enters a SYNC state 403 (FIG. 13). Report register 2230 (FIG. 11) includes three bits comprising a Receiver State Field (RSF) used to inform processor 2001 of events within receiver 2400. When receive control circuit 2401 enters the SYNC state 403, it stores the field RSF=OOO in report register 2230 indicating that an opening flag has been detected (FIG. 14). Subsequent bits received on data link 51 are shifted first into control shift register 2406, then into 16-bit FCS holding register 2409 via a conductor 2452 and then into eight-bit receive shift register 2410. Bits transmitted by control shift register 2406 are also shifted into 16-bit FCS shift register 2408 which, after being initialized to have an FCS field of 16 logic one bits, sequentially generates the above-described FCS field. Recall that the bits comprising the PREEMPT, ABORT or FLAG characters are not shifted into registers 2408, 2409 and 2410. Receive control circuit 2401 monitors the bit stream transmitted by control shift register 2406 and maintains an internal status variable defining the number, $N_4$, of consecutive logic one bits transmitted by control shift register 2406. When the internal status variable defining $N_4$ indicates that five consecutive logic one bits have been transmitted by control shift register 2406, receive control circuit 2401 controls registers 2408, 2409 and 2410 via control bus 2402 such that the next bit transmitted by control shift register 2406, which should be an inserted dummy zero bit, is not shifted into those registers 2408, 2409 and 2410. When 24 bits (excluding dummy zero bits) have been received on data link 51 after the opening flag, receive control circuit 2401 determines based on the bit count that receive shift register 2410 contains the address field of the frame (FIG. 2) and receive control circuit 2401 thereafter enters an ADDRESS state 404 (FIG. 13). In the ADDRESS state 404, receive control circuit 2401 effects a transfer of the contents of receive shift register 2410 in parallel via path 2251 to receive data register 2250 and writes the field RSF=001 and a logic one Receive Data Register Full (RDRF) bit into report register 2230 indicating that an address byte is available in receive data register 2250. The RDRF bit is monitored via a path 2209 by an interrupt generator 2290, which, in response to the logic one RDRF bit, transmits an interrupt signal to processor 2001 via a conductor 2201-I. Processor 2001 reads the RSF field in report register 2230 via data bus 2001-DB, and in response thereto reads the address byte from receive data register 2250 via data bus 2001-DB. Processor 2001 interprets the address byte and is informed thereby that data bytes subsequently received in receive data register 2250 are to be conveyed via data bus 2001-DB to formatter interface 2010 and in turn to destination user device 10'. Receive control circuit 2401 now enters a DATA state 405 (FIG. 13). In the DATA state 405, subsequently received bits from data link 51 continue to be shifted into the registers 2406, 2408, 2409 and 2410. Receive control circuit 2401 maintains a second internal status variable defining the number, $N_3$, of bits shifted into receive shift register 2410 since the last byte was transferred from receive shift register 2410 to receive data register 2250. When such variable indicates that eight bits have been shifted into receive shift register 2410, receive control circuit 2401 effects a transfer of the contents of receive shift register 2410 in parallel via path 2251 to receive data register 2250 and writes the field RSF=010 (FIG. 14) and a logic one RDRF bit into report register 2230, indicating that a data byte is available in receive data register 2250. Processor 2001 responds to such report register 2230 information by controlling the transmission of the data byte in receive data register 2250 to formatter interface 2010. This process repeats and subsequent data bits received on link 51 are conveyed in eight-bit bytes to formatter interface 2010 until character detector 2407 informs receive control circuit 2401 via report bus 2403 of the presence of a FLAG character 01111110, an ABORT character 11111111 or a PREEMPT character 11111110 in control shift register 2406. In accordance with the example of FIG. 2, the next such character to be received on data link 51 is the closing flag of the frame. Upon the detection of the closing flag, receive control circuit 2401 enters an FCS state 406 (FIG. 13). In the FCS state 406, receive control circuit 2401 effects a transfer of the contents of receive shift register 2410, which contents comprise the last byte of the frame data field, to receive data register 2250 and then to formatter interface 2010. FCS holding register 2409 contains the frame FCS field at this time. The frame FDC field has also been shifted into FCS shift register 2408. The operation of FCS shift register 2408 is such that after the entire frame, excluding the opening flag but including the FCS field, has been shifted in, the generated 16-bit FCS field should equal a constant field if none of the bits received on data link 51 were in error. FCS shift register 2408, to be described in more detail later herein, compares the generated FCS field with the constant field and informs receive control circuit 2401 of the result via report bus 2403. Receive control circuit 2401 then writes either the field RSF=011 (FIG. 14) indicating that the frame was completed without error or the field RSF=111 indicating that the frame was completed with error in report register 2230 via path 2231 and processor 2001 upon detecting such RSF field appropriately informs formatter interface 2010. Receive control circuit 2401 then returns to SYNC state 403. In accordance with the example of FIG. 2, no subsequent frame is immediately forthcoming and consecutive logic one bits are transmitted on link 51. After eight consecutive logic one bits are shifted into control shift register 2406, character detector 2407 detects the presence of the ABORT character 11111111 in register 2406 and so informs receive control circuit 2401 via report bus 2403. In response, receive control circuit 2401 returns to the HUNT state 402 and writes the field RSF=100 (FIG. 14) into report register 2230 indicating the detection of the ABORT character. When a subsequent ABORT character is shifted into control shift register 2406 and such character is detected by character detector 2407, receive control circuit 2401 writes the field RSF=101 (FIG. 14) into report register 2230 indicating that data link 51 is now idle. This completes the reception of the frame of FIG. 2 by link controller 2000. If at any time while receive control circuit 2401 was in the SYNC state 403, the ADDRESS state 404 or the DATA state 405, character detector 2407 had detected the ABORT character 11111111, receive control circuit 2401 would have returned to the HUNT state 402.

In accordance with the second example (FIG. 3), after the opening flag, the address field and at least 16 non-FLAG bits of the frame from user device 10 have been received on data link 51, the PREEMPT character 11111110 is received. At this time, receive control circuit 2401 is in the DATA state 405. When character detector 2407 detects the PREEMPT character, it so informs receive control circuit 2401 via report bus 2403 and, in response, receive control circuit 2401 enters a PREEMPT state 407 (FIG. 13) and transmits the present values of its internal status variables defining $N_3$ and $N_4$ to state register 2404 via path 2430 for storage therein. Receive control circuit 2401 then effects a transmission of the contents of registers 2404, 2410, 2409 and 2408, which contents comprise the present values of the second set of status variables, to stack memory 2420 to be saved in predefined locations therein. Receive control circuit 2401 writes the field RSF=110 (FIG. 14) in report register 2230 indicating the detection of a PREEMPT character and thereby informs processor 2001 that the next byte made available in receive data register 2250 will be an address byte defining the destination of the preempting frame. Processor 2001 stores the address field defining the destination of the preempted frame for use when the reception of that frame is resumed. Receive control circuit 2401 then effects a reinitialization of FCS shift register 2408 to an FCS field of 16 logic one bits and returns to the HUNT state 402. As the preempting frame (FIG. 3) is received on data link 51, receive control circuit 2401 enters the SYNC state 403, the ADDRESS state 404, the DATA state 405 and the FCS state 406 in the above-described manner. Stack control circuit 2422 stores a bit defining whether stack memory 2420 is empty. After FCS shift register 2408 informs receive control circuit 2401 via report bus 2403 whether the preempting frame was received with or without errors, receive control circuit 2401 reads the stored stack control circuit 2422 bit, which in accordance with the present example, indicates that stack memory 2420 is not empty. In response, receive control circuit 2401 enters a RESUME state 408 (FIG. 13). In the RESUME state 408, receive control circuit 2401 allows the first eight bits following the preempting frame closing flag to be shifted into control shift register 2406. Receive control circuit 2401 also effects a transmission of the values of the second set of status variables, which values are saved in stack memory 2420, via multiplexer/demultiplexer 2421 and paths 2414, 2413, 2412 and 2411 to registers 2404, 2410, 2409 and 2408, respectively. Receive control circuit 2401 then reads the contents of state register 2404 via path 2431 to return its two internal status variables to their values at the point of graceful preemption. Receive control circuit 2401 then returns to the DATA state 405 and the balance of the preempted frame is received in the above-described manner.

Figure 15:
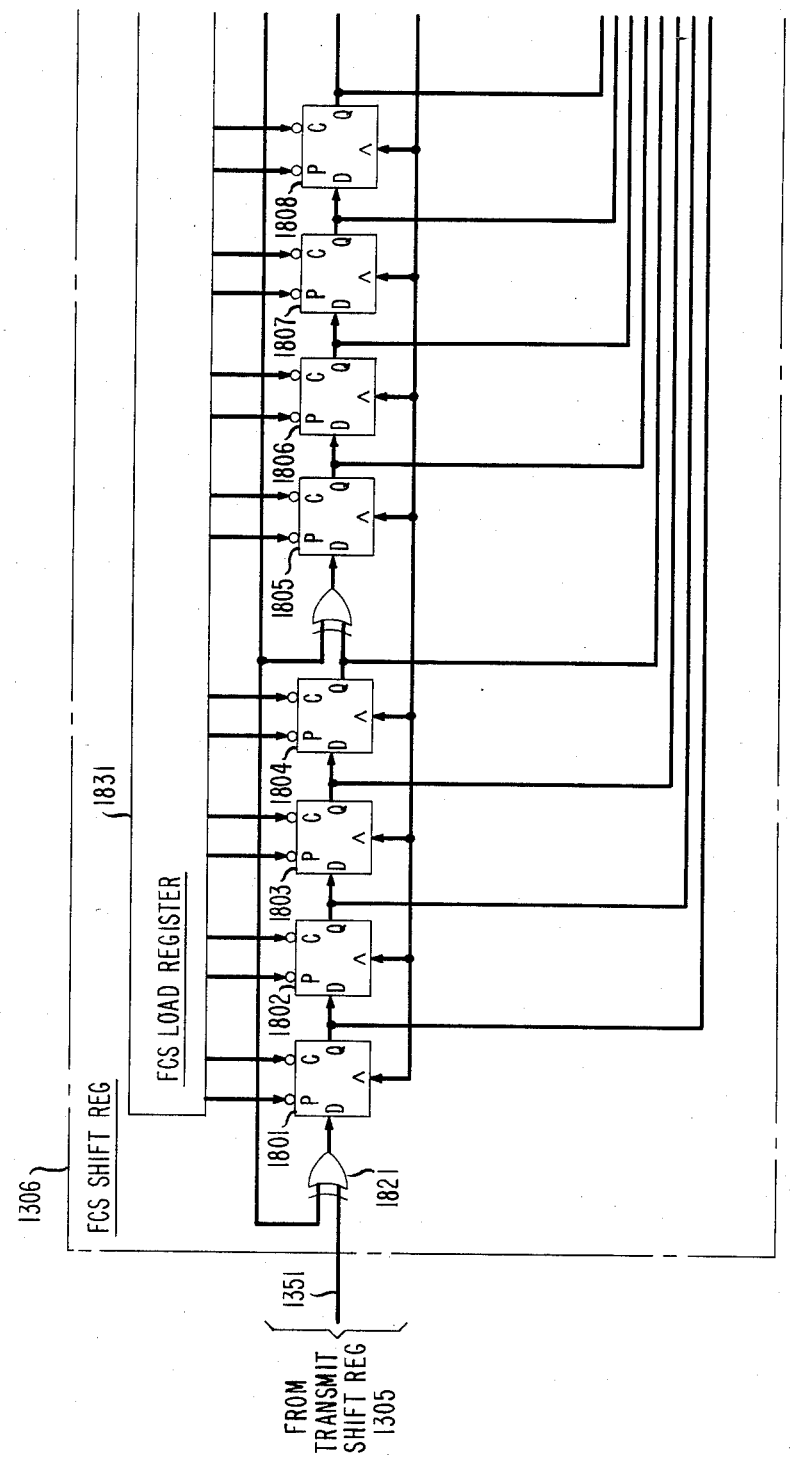
FIGS. 15 and 16 when arranged in accordance with FIG. 17 present a detailed diagram of a frame check sequence shift register used in the link controller of FIGS. 4 and 5.
Figure 16:
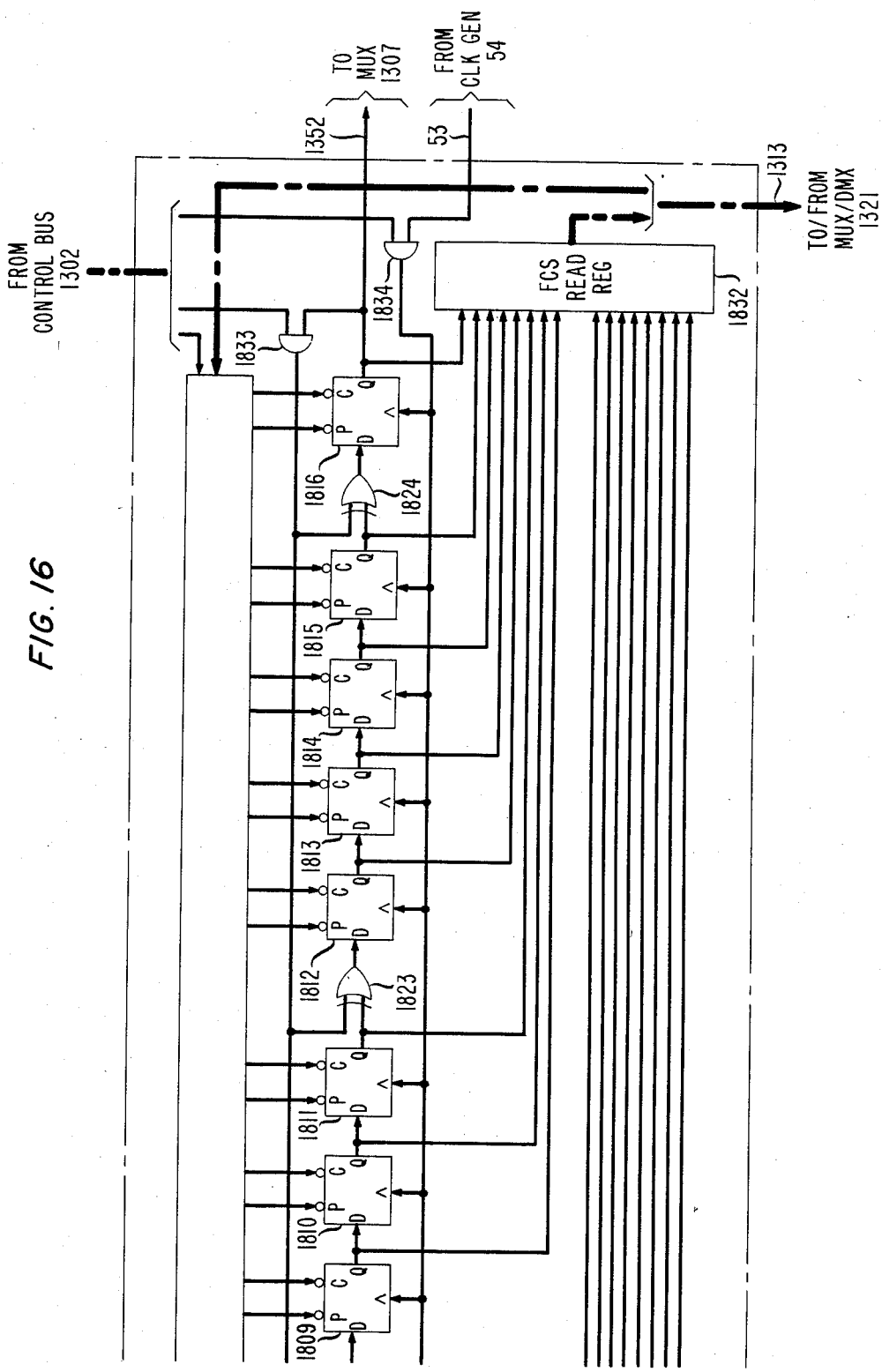

An exemplary embodiment of FCS shift register 1306, shown in FIGS. 15 and 16 arranged in accordance with FIG. 17, includes 16 D-type flip-flops 1801 through 1816 arranged as a shift register. Each of the flip-flops 1801 through 1816 has a preset input terminal P and a clear input terminal C, which terminals are used to initialize the flip-flops to predetermined values. Transmitting a logic zero signal and a logic one signal to the P and C terminals, respectively, of a given flip-flop results in a logic one signal being present at the Q output terminal of that flip-flop. Similarly, transmitting a logic one signal and a logic zero signal to the P and C terminals, respectively, results in a logic zero being present at the Q output terminal. Transmitting logic one signals to both the P and C terminals results in the logic signal at the D input terminal being stored by the flip-flop and present at the Q output terminal. Transmit control circuit 1301 (FIG. 5) initializes FCS shift register 1306 by transmitting a signal via control bus 1302 to an FCS load register 1831, which, in response, transmits logic zero signals to the 16 flip-flop 1801 through 1816 P terminals and logic one signals to the C terminals. Accordingly, each of the flip-flops 1801 through 1816 is initialized to have a logic one signal at its Q output terminal.

FCS shift register 1306 operates in two modes—a generate mode where it sequentially generates a 16-bit FCS field from bits transmitted by transmit shift register 1305 (FIG. 5) on conductor 1352 and a shift mode where the contents of the flip-flops 1801 through 1816 are sequentially transmitted to multiplexer 1307 (FIG. 5) on conductor 1352. Transmit control circuit 1301 transmits a logic one signal to a first input terminal of an AND gate 1833 to place FCS shift register 1306 in the generate mode. Since the Q terminal of flip-flop 1816 is connected to the second input terminal of AND gate 1833, when FCS generator 1306 is in the generate mode the logic signal transmitted at the flip-flop 1816 Q terminal is fed back via AND gate 1833 to an input terminal of each of four exclusive-OR gates 1821 through 1824. Gates 1821 through 1824 are respectively interposed between transmit shift register 1305 and flip-flop 1801, between flip-flop 1804 and flip-flop 1805, between flip-flop 1811 and flip-flop 1812 and between flip-flop 1815 and flip-flop 1816 to generate the particular frame check sequence of the present exemplary embodiment. Transmit control circuit 1301 effects the clocking of flip-flops 1801 through 1816 by transmitting a logic one signal to a first input terminal of an AND gate 1834, whereupon the clock signal transmitted by clock generator 54 on clock line 53 to the second input terminal of AND gate 1834 is thereafter applied to the flip-flops 1801 through 1816. Accordingly, in the generate mode for any given bit received from transmit shift register 1305 on conductor 1351, the signals at the Q terminals of the flip-flops 1801 through 1816 comprise the 16-bit FCS field at that time. When transmit control circuit 1301 transmits a logic zero signal to the first input terminal of AND gate 1833, FCS shift register 1306 operates in the shift mode wherein AND gate 1833 transmits a logic zero signal to each of the exclusive-OR gates 1821 through 1824 and the contents of flip-flops 1801 through 1816 are sequentially transmitted to multiplexer 1307 on conductor 1352.

The signals transmitted by each of the flip-flops 1801 through 1816 Q output terminals are stored in an FCS read register 1832. When transmit control circuit 1301 determines that a graceful preemption is to occur, the contents of FCS read register 1832 are transmitted to stack memory 1320 via multiplexer-demultiplexer 1321 for storage therein. Transmit control circuit 1301 again transmits a signal to FCS load register 1831 to reinitialize each of the flip-flops 1801 through 1816 to have a logic one signal at the Q terminal. After the closing flag of the preempting frame is transmitted, transmit control circuit 1301 effects a transmission of the stored 16-bit FCS field from stack memory 1320 to FCS load register 1831, which, in response, transmits the appropriate signals to the flip-flop P and C terminals such that the signals at the Q terminals are exactly the same as they were at the point of graceful preemption.

Figure 18:
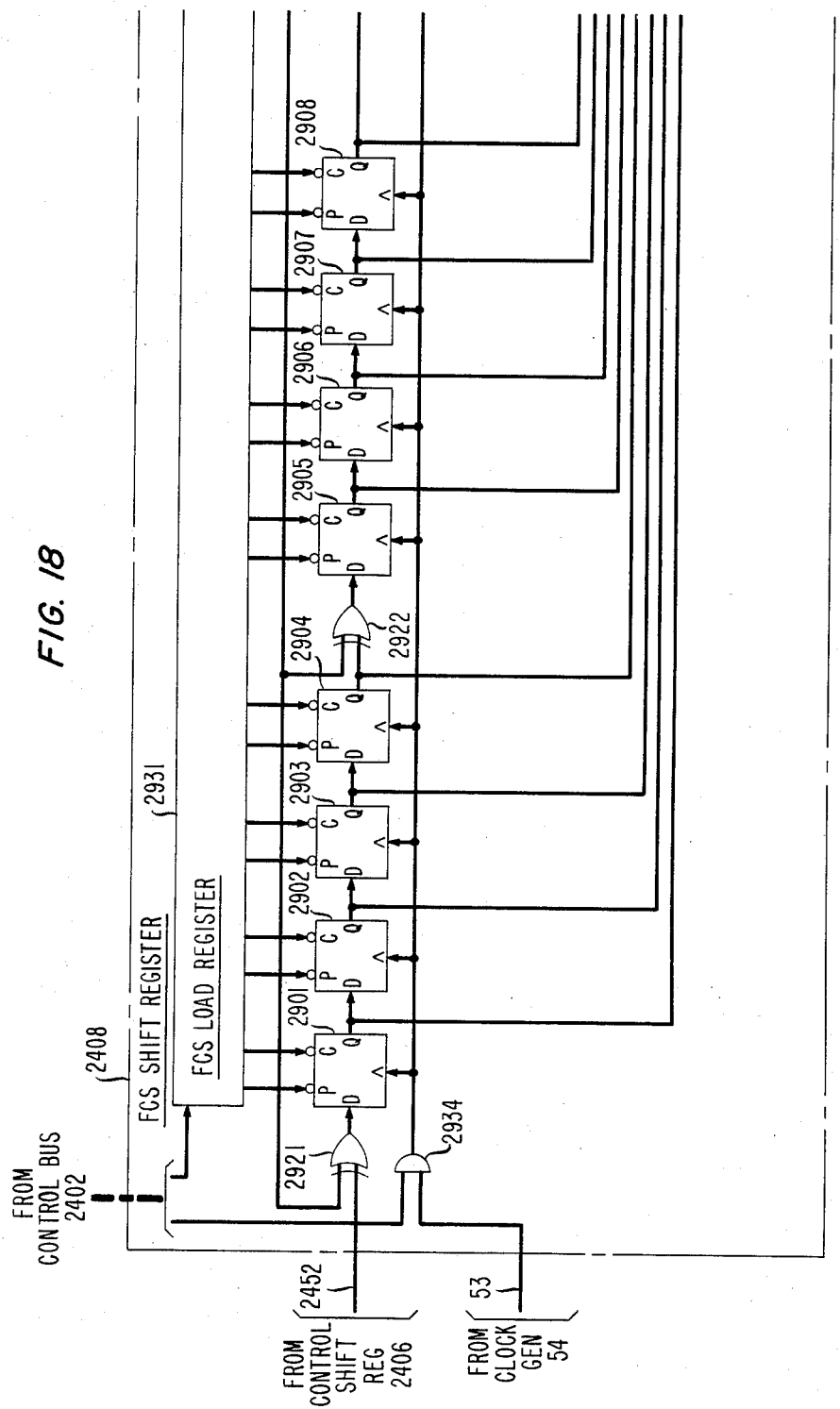
FIGS. 18 and 19 arranged in accordance with FIG. 20 present a detailed diagram of a frame check sequence shift register used in the link controller of FIGS. 7 and 8.
Figure 19:
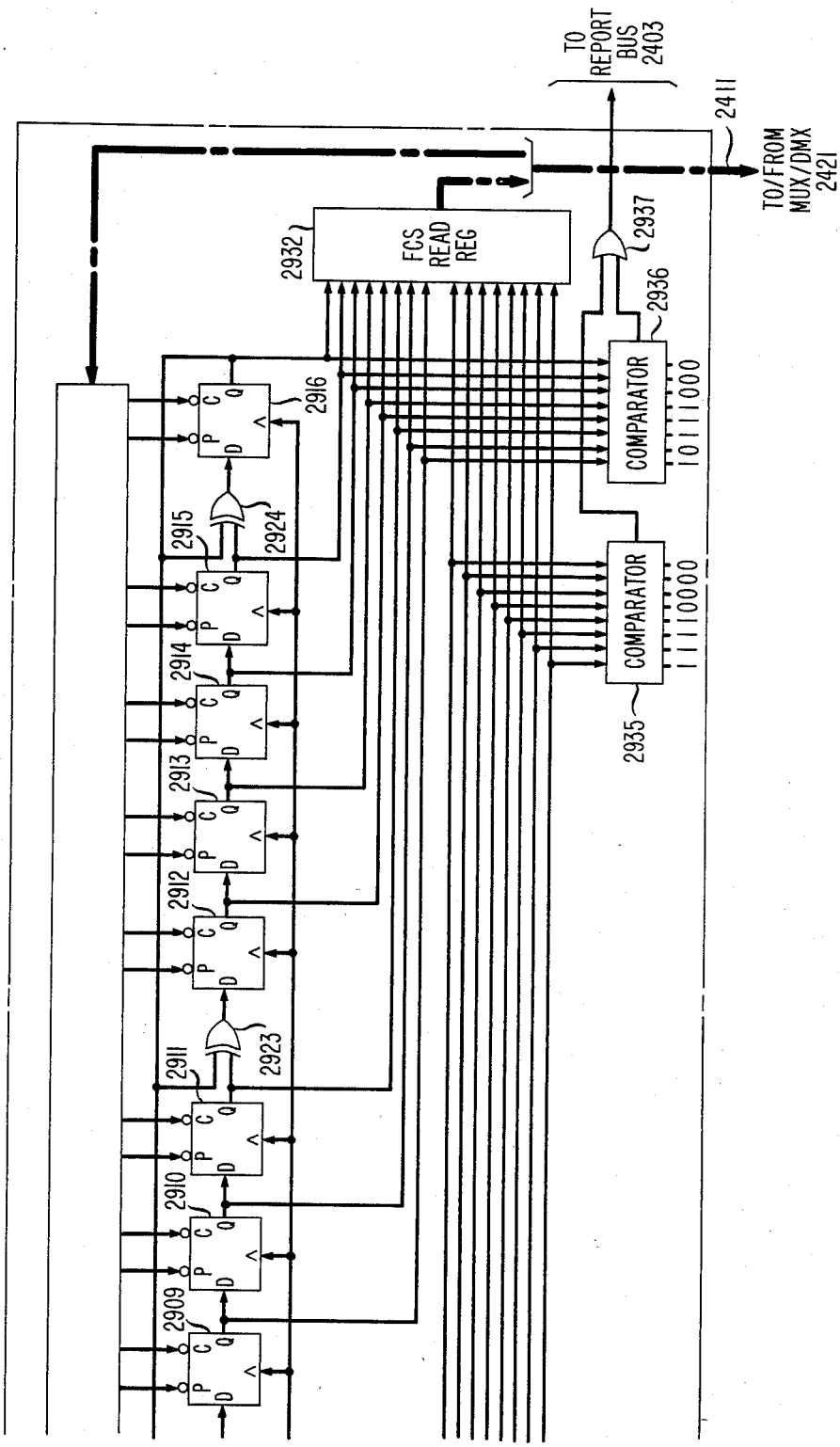

FCS shift register 2408, which is shown in FIGS. 18 and 19 arranged in accordance with FIG. 20, includes 16 D-type flip-flops 2901 through 2916, four exclusive-OR gates 2921 through 2924 and an AND gate 2934 which generate the FCS field in the same manner as flip-flops 1801 through 1816, exclusive-OR gates 1821 through 1824 and AND gate 1834 of FCS shift register 1306. FCS shift register 2408 also includes an FCS load register 2931 and an FCS read register 2932 which operate under the control of receive control circuit 2401 (FIG. 8) to initialize flip-flops 2901 through 2916 and to store their contents in stack memory 2420 in the same manner that FCS load register 1831 and FCS read register 1832 operate under the control of transmit control circuit 1301 to initialize flip-flops 1801 through 1816 and to store their contents in stack memory 1320. FCS shift register 2408, however, operates only in the generate mode since it is not required to sequentially transmit its FCS field and accordingly the equivalent of AND gate 1833 is not included in FCS shift register 2408. The frame check sequence of the present embodiment is such that after the FCS field of a given frame is shifted into FCS shift register 2408, the generated FCS field should be a predetermined constant field is no errors were received. Therefore the signals at the Q output terminals of the flip-flops 2901 through 2916 are compared with predetermined constant fields by two eight-bit comparators 2935 and 2936. When either of the comparators 2935 or 2936 detects a difference between the signal at a flip-flop Q terminal and the predetermined constant, it transmits a logic one signal to an OR gate 2937 which in turn transmits a logic one signal via report bus 2403 informing receive control circuit 2401 of the detected error.

It is to be understood that the above-described embodiment is merely illustrative of the principles of the invention and that other embodiments may be devised by those skilled in the art without departing from the spirit and scope of the invention. For example, although only certain variables were included in the first and second sets of status variables defined herein, it is to be understood that as the functions performed within the link controllers become increasingly complex, additional variables may be included in those sets. Further, the above-described frame check sequence is only illustrative and other error checking methods can be used rather than the particular method described herein.

What is claimed is:

1. A link controller for communicating from a plurality of user devices over a communications medium comprising
   coupling means for selectively coupling said user devices to said communications medium for communication in frames, said coupling means being associated with a set of status variables collectively defining the present status of said coupling means,
   selection means for selecting a given one of said user devices while a given other one of said user devices is coupled to said communications medium for communication,
   means responsive to said selection means for transmitting a start preemption signal on said communications medium, and
   means responsive to said selection means for saving values of said set of status variables,
   wherein said coupling means is responsive to said selection means for interrupting a transmission to said communications medium of a first frame from said given other one of said user devices before a portion of said first frame is transmitted, and for transmitting to said communications medium a second frame from said given one of said user devices.

2. A link controller in accordance with claim 1 further comprising
   means for generating a completion signal indicating the end of communication by said given one of said user devices and
   means responsive to said completion signal for returning said coupling means to the status defined by said saved values of said set of status variables,
   wherein said coupling means is responsive to said completion signal for transmitting said portion of said first frame to said communications medium after the transmission of said second frame.

3. A link controller comprising
   receiver means for receiving communications from a communications medium in frames, said receiver means being associated with a set of status variables collectively defining the present status of said receiver means,
   means responsive to a receipt of a start preemption signal after the reception by said receiver means of a portion of a first frame from said communications medium, for saving values of said set of status variables, and
   means responsive to a receipt of an end preemption signal after the reception by said receiver means of a second frame from said communications medium, for returning said receiver means to the status defined by said saved values of said set of status variables,
   wherein said receiver means is responsive to said end preemption signal for receiving a second portion of said first frame after said second frame is received.

4. In an arrangement comprising means for transmitting a preempt character over a communications medium and receiver means for receiving communications from said communications medium in frame, said receiver means being associated with a set of status variables collectively defining the present status of said receiver means, a method of gracefully preempting the reception from said communications medium of a first frame before a portion of said first frame is received comprising detecting said preempt character from said communications medium, saving values of said set of status variables, receiving a second frame from said communications medium, returning, after said second frame is received, said receiver means to the status defined by said saved values of said set of status variables and receiving, after said second frame is received, said portion of said first frame.

5. A communication system for communicating from a plurality of user devices over a communications medium comprising coupling means for selectively coupling said user devices to said communications medium for communication, said coupling means being associated with a first set of status variables collectively defining the present status of said coupling means, receiver means for receiving communication from said communications medium, said receiver means being associated with a second set of status variables collectively defining the present status of said receiver means, selection means for selecting a given one of said user devices while a given other one of said user devices is coupled to said communications medium for communication, means responsive to said selection means for interrupting communication from said given other one of said user devices, means responsive to said selection means for saving values of said first set of status variables, means responsive to said selection means for transmitting a start preemption signal on said communications medium, means responsive to said selection means for coupling said given one of said user devices to said communications medium for communication and means responsive to said start preemption signal for saving values of said second set of status variables.

6. A communication system in accordance with claim 5 further comprising means for generating a completion signal indicating the end of communication by said given one of said user devices, means responsive to said completion signal for transmitting an end preemption signal on said communications medium, means responsive to said completion signal for returning said coupling means to the status defined by said saved values of said first set of status variables and means responsive to said end preemption signal for returning said receiver means to the status defined by said saved values of said second set of status variables.

7. A link controller for transmitting data from a plurality of user devices over a communications medium comprising transmit data register means for storing data, a plurality of formatter interfaces each associated with one of said user devices for receiving data from that user device and transmitting that data to said transmit data register means for storage therein, transmit control means for generating control signals, transmit shift register means comprising means responsive to said control signals for reading data from said transmit data register means and means responsive to said control signals for serially transmitting bits of data read from said transmit data register means to said communications medium, processor means comprising selection means for selecting a given one of said formatter interfaces while a given other one of said formatter interfaces is transmitting data to said transmit data reigster means, means responsive to said selection means for interrupting data transmission by said given other one of said formatter interfaces and means responsive to said selection means for initiating data transmission by said given one of said formatter interfaces and stack memory means for saving information and wherein said transmit control means further comprises means responsive to said selection means for generating control signals for effecting a saving by said stack memory means of data read by said transmit shift register means but not serially transmitted thereby to said communications medium.

8. A link controller in accordance with claim 7 whwerein each of said plurality of formatter interfaces further comprises means for transmitting a completion signal to said processor means indicating the end of data transmission by that formatter interface, wherein said processor means further comprises means responsive to said completion signal for transmitting an end signal to said transmit control means and means responsive to said completion signal for reinitiating data transmission by said given other one of said formatter interfaces and wherein said transmit control means further comprises means responsive to said end signal for generating control signals for effecting a transmission from said stack memory means to said transmit shift register means of said data saved by said stack memory means.

9. A link controller in accordance with claim 7 wherein said transmit control means further comprises means for counting the number, $N_1$, of bits of data transmitted by said transmit shift register means since a reading of data from said transmit data register means by said transmit shift register means and means responsive to said selection means for generating control signals for effecting a saving by said stack memory means of a representation of said number, $N_1$.

10. A link controller in accordance with claim 9 wherein each of said plurality of formatter interfaces further comprises means for transmitting a completion signal to said processor means indicating the end of data transmission by the formatter interface, wherein said processor means further comprises means responsive to said completion signal for transmitting an end signal to said transmit control means and means responsive to said completion signal for reinitiating data transmission by said given other one of said formatter interfaces and wherein said transmit control means further comprises means responsive to said end signal for generating control signals for effecting a transmission from said stack memory means to said transmit shift register means of said data saved by said stack memory means and means responsive to said end signal for generating control signals for effecting a transmission from said stack memory means to said transmit control means of said representation of said number, $N_1$, saved by said stack memory means.

11. A link controller in accordance with claim 10 further comprising multiplexer means for transmitting bits having a first predetermined logic value to said communications medium, frame check sequence generator means for generating a frame check sequence of bits from bits transmitted by said transmit shift register means and wherein said transmit control means further comprises means for counting the number, $N_2$, of consecutive bits of data transmitted by said transmit shift register means having a second predetermined logic value, means for generating control signals for effecting the transmission by said multiplexer means of a bit having said first predetermined logic value when said number, $N_2$, equals a predetermined number, means responsive to said selection means for generating control signals for effecting a saving by said stack memory means of a representation of said number, $N_2$, means responsive to said selection means for generating control signals for effecting a saving by said stack memory means of said frame check sequence, means responsive to said end signal for generating control signals for effecting a transmission from said stack memory means to said transmit control means of said representation of said number, $N_2$, saved by said stack memory means and means responsive to said end signal for generating control signals for effecting a transmission from said stack memory means to said frame check sequence generator means of said frame check sequence saved by said stack memory means.

12. A link controller in accordance with claim 11 wherein said multiplexer means further comprises means for transmitting said second predetermined logic value to said communications medium and wherein said transmit control means further comprises means responsive to said selection means for effecting a transmission by said multiplexer means to said communications medium of a start preemption signal comprising a first predetermined sequence of bits and means responsive to said end signal for effecting a transmission by said multiplexer means to said communications medium of an end preemption signal comprising a second predetermined sequence of bits.

13. A link controller in accordance with claim 9 further comprising multiplexer means for transmitting bits having a first predetermined logic value to said communications medium, frame check sequence generator means for generating a frame check sequence of bits from bits transmitted by said transmit shift register means and wherein said transmit control means further comprises means for counting the number, $N_2$, of consecutive bits of data transmitted by said transmit shift register means having a second predetermined logic value, means for generating control signals for effecting the transmission by said multiplexer means of a bit having said first predetermined logic value when said number, $N_2$, equals a predetermined number, means responsive to said selection means for generating control signals for effecting a saving by said stack memory means of a representation of said number, $N_2$, and means responsive to said selection means for generating control signals for effecting a saving by said stack memory means of said frame check sequence.

14. A link controller in accordance with claim 7 further comprising multiplexer means for transmitting bits having a first predetermined logic value to said communications medium and wherein said transmit control means further comprises means for counting the number, $N_2$, of consecutive bits of data transmitted by said transmit shift register means having a second predetermined logic value, means for generating control signals for effecting the transmission by said multiplexer means of a bit having said first predetermined logic value when said number, $N_2$, equals a predetermined number and means responsive to said selection means for generating control signals for effecting a saving by said stack memory means of a representation of said number, $N_2$.

15. A link controller in accordance with claim 14 wherein each of said plurality of formatter interfaces further comprises means for transmitting a completion signal to said processor means indicating the end of data transmission by that formatter interface, wherein said processor means further comprises means responsive to said completion signal for transmitting an end signal to said transmit control means and means responsive to said completion signal for reinitiating data transmission by said given other one of said formatter interfaces and wherein said transmit control means further comprises means responsive to said end signal for generating control signals for effecting a transmission from said stack memory means to said transmit shift register means of said data saved by said stack memory means and means responsive to said end signal for generating control signals for effecting a transmission from said stack memory means to said transmit control means of said representation of said number, $N_2$, saved by said stack memory means.

16. A link controller in accordance with claim 15 wherein said multiplexer means further comprises means for transmitting said second predetermined logic value to said communications medium and wherein said transmit control means further comprises means responsive to said selection means for effecting a transmission by said multiplexer means to said communications medium of a start preemption signal comprising a first predetermined sequence of bits and means responsive to said end signal for effecting a transmission by said multiplexer means to said communications medium of an end preemption signal comprising a second predetermined sequence of bits.

17. A link controller in accordance with claim 7 further comprising
frame check sequence generator means for generating a frame check sequence of bits from bits transmitted by said transmit shift register means and
wherein said transmit control means further comprises means responsive to said selection means for generating control signals for effecting a saving by said stack memory means of said frame check sequence.

18. A link controller in accordance with claim 17
wherein each of said plurality of formatter interfaces further comprises means for transmitting a completion signal to said processor means indicating the end of data transmission by that formatter interface,
wherein said processor means further comprises means responsive to said completion signal for transmitting an end signal to said transmit control means and means responsive to said completion signal for reinitiating data transmission by said given other one of said formatter interfaces and
wherein said transmit control means further comprises means responsive to said end signal for generating control signals for effecting a transmission from said stack memory means to said transmit shift register means of said data saved by said stack memory means and means responsive to said end signal for generating control signals for effecting a transmission from said stack memory means to said frame check sequence generating means of said frame check sequence saved by said stack memory means.

19. A link controller in accordance with claim 7 wherein said transmit control means further comprises means responsive to said selection means for generating control signals for effecting a saving by said stack memory means of a byte stored by said transmit data register means but not read by said transmit shift register means.

20. A link controller in accordance with claim 19
wherein each of said plurality of formatter interfaces further comprises means for transmitting a completion signal to said processor means indicating the end of data transmission by that formatter interface,
wherein said processor means further comprises means responsive to said completion signal for transmitting an end signal to said transmit control means and means responsive to said completion signal for reinitiating data transmission by said given other one said formatter interfaces and
wherein said transmit control means further comprises means responsive to said end signal for generating control signals for effecting a transmission from said stack memory means to said transmit shift register means of said data saved by said stack memory means and means responsive to said end signal for generating control signals for effecting a transmission from said stack memory means to said transmit data register means of said byte saved by said stack memory means.

21. A link controller for transmitting data from a plurality of user devices over a communications medium comprising transmit data register means for storing data,
a plurality of formatter interfaces each associated with one of said user devices for receiving data from that user device and transmitting that data to said transmit data register means for storage therein,
transmit control means for generating control signals,
transmit shift register means comprising means responsive to said control signals for reading data from said transmit data register means and means responsive to said control signals for serially transmitting bits of data read from said transmit data register means to said communications medium,
processor means comprising selection means for selecting a given one of said formatter interfaces while a given other one of said formatter interfaces is transmitting data to said transmit data register means, means responsive to said selection means for interrupting data transmission by said given other one of said formatter interfaces and means responsive to said selection means for initiating data transmission by said given one of said formatter interfaces,
multiplexer means for transmitting bits having a first predetermined logic value to said communications medium and
stack memory means for saving information and
wherein said transmit control means further comprises means for counting the number, $N_2$, of consecutive bits of data transmitted by said transmit shift register means having a second predetermined logic value, means for generating control signals for effecting the transmission by said multiplexer means of a bit having said first predetermined logic value when said number, $N_2$, equals a predetermined number and means responsive to said selection means for generating control signals for effecting a saving by said stack memory means of a representation of said number, $N_2$.

22. A link controller in accordance with claim 21
wherein each of said plurality of formatter interfaces further comprises means for transmitting a completion signal to said processor means indicating the end of data transmission by that formatter interface,
wherein said processor means further comprises means responsive to said completion signal for transmitting an end signal to said transmit control means and means responsive to said completion signal for reinitiating data transmission by said given other one of said formatter interfaces and
wherein said transmit control means further comprises means responsive to said end signal for generating control signals for effecting a transmission from said stack memory means to said transmit control means of said representation of said number, $N_2$, saved by said stack memory means.

23. A link controller for transmitting data from a plurality of user devices over a communications medium comprising
transmit data register means for storing data,
a plurality of formatter interfaces each associated with one of said user devices for receiving data from that user device and transmitting that data to said transmit data register means for storage therein,
transmit control means for generating control signals, transmit shift register means comprising means responsive to said control signals for reading data from said transmit data register means and means responsive to said control signals for serially transmitting bits of data read from said transmit data register means to said communications medium, processor means comprising selection means for selecting a given one of said formatter interfaces while a given other one of said formatter interfaces is transmitting data to said transmit data register means, means responsive to said selection means for interrupting data transmission by said given other one of said formatter interfaces and means responsive to said selection means for initiating data transmission by said given one of said formatter interfaces, frame check sequence generator means for generating a frame check sequence of bits from bits transmitted by said transmit shift register means and stack memory means for saving information and wherein said transmit control means further comprises means responsive to said selection means for generating control signals for effecting a saving by said stack memory means of said frame check sequence.

24. A link controller in accordance with claim 23
wherein each of said plurality of formatter interfaces further comprises means for transmitting a completion signal to said processor means indicating the end of data transmission by that formatter interface, wherein said processor means further comprises means responsive to said completion signal for transmitting an end signal to said transmit control means and means responsive to said completion signal for reinitiating data transmission by said given other one of said formatter interfaces and wherein said transmit control means further comprises means responsive to said end signal for generating control signals for effecting a transmission from said stack memory means to said frame check sequence generator means of said frame check sequence saved by said stack memory means.

25. An arrangement comprising
means for transmitting a start preemption signal on a communications medium, receive data register means for storing data, receive control means for generating control signals, receive shift register means comprising means responsive to said control signals for serially receiving bits of data from said communications medium and means responsive to said control signals for transmitting data received from said communications medium to said receive data register means for storage therein and stack memory means for saving information and wherein said receive control means further comprises means responsive to said start preemption signal for generating control signals for effecting a saving by said stack memory means of data received by said receive shift register means but not transmitted thereby to said receive data register means.

26. An arrangement in accordance with claim 25 further comprising
means for transmitting an end preemption signal on said communications medium and wherein said receive control means further comprises means responsive to said end preemption signal for generating control signals for effecting a transmission from said stack memory means to said receive shift register means of said data saved by said stack memory means.

27. An arrangement in accordance with claim 25 wherein said receive control means further comprises means for counting the number, $N_3$, of bits of data received by said receive shift register means since a transmission of data by said receive shift register means to said receive data register means and means responsive to said start preemption signal for generating control signals for effecting a saving by said stack memory means of a representation of said number, $N_3$.

28. An arrangement in accordance with claim 24 further comprising
means for detecting an end preemption signal on said communications medium and wherein said receive control means further comprises means responsive to said end preemption signal for generating control signals for effecting a transmission from said stack memory means to said receive shift register means of said data saved by said stack memory means and means responsive to said end preemption signal for generating control signals for effecting a transmission from said stack memory means to said receive control means of said representation of said number, $N_3$, saved by said stack memory means.

29. An arrangement in accordance with claim 28 further comprising
frame check sequence generator means for generating a frame check sequence of bits from bits received from said communications medium and wherein said receive control means further comprises means for counting the number, $N_4$, of consecutive bits received from said communications medium having a predetermined logic value, means for generating control signals for inhibiting the reception by said receive shift register means of a bit from said communications medium when said number, $N_4$, equals a predetermined number, means responsive to said start preemption signal for generating control signals for effecting a saving by said stack memory means of a representation of said number, $N_4$, means responsive to said start preemption signal for generating control signals for effecting a saving by said stack memory means of said frame check sequence, means responsive to said end preemption signal for generating control signals for effecting a transmission from said stack memory means to said receive control means of said representation of said number, $N_4$, saved by said stack memory means and means responsive to said end preemption signal for generating control signals for effecting a transmission from said stack memory means to said frame check sequence generator means of said frame check sequence saved by said stack memory means.

30. An arrangement in accordance with claim 27 further comprising
frame check sequence generator means for generating a frame check sequence of bits from bits received from said communications medium and wherein said receive control means further comprises means for counting the number, $N_4$, of consecutive bits received from said communications medium having a predetermined logic value, means for generating control signals for inhibiting the reception by said receive shift register means of a bit from said communications medium when said number, $N_4$, equals a predetermined number, means responsive to said start preemption signal for generating control signals for effecting a saving by said stack memory means of a representation of said number, $N_4$, and means responsive to said start preemption signal for generating control signals for effecting a saving by said stack memory means of said frame check sequence.

31. An arrangement in accordance with claim 25 wherein said receive control means further comprises means for counting the number, $N_4$, of consecutive bits received from said communications medium having a predetermined logic value, means for generating control signals for inhibiting the reception by said receive shift register means of a bit from said communications medium when said number, $N_4$, equals a predetermined number and means responsive to said start preemption signal for generating control signals for effecting a saving by said stack memory means of a representation of said number, $N_4$.

32. An arrangement in accordance with claim 30 further comprising
    means for transmitting an end preemption signal on said communications medium and
    wherein said receive control means further comprises means responsive to said end preemption signal for generating control signals for effecting a transmission from said stack memory means to said receive shift register means of said data saved by said stack memory means and means responsive of said end preemption signal for generating control signals for effecting a transmission from said stack memory means to said receive control means of said representation of said number, $N_4$, saved by said stack memory means.

33. An arrangement in accordance with claim 25 further comprising
    frame check sequence generator means for generating a frame check sequence of bits from bits received from said communications medium and
    wherein said receive control means further comprises means responsive to said start preemption signal for generating control signals for effecting a saving by said stack memory means of said frame check sequence.

34. An arrangement in accordance with claim 33 further comprising
    means for transmitting an end preemption signal on said communications medium and
    wherein said receive control means further comprises means responsive to said end preemption signal for generating control signals for effecting a transmission from said stack memory means to said receive shift register means of said data saved by said stack memory means and means responsive to said end preemption signal for generating control signals for effecting a transmission from said stack memory means to said frame check sequence generator means of said frame check sequence saved by said stack memory means.

35. An arrangement comprising
    means for transmitting a start preemption signal on a communications medium,
    receive data register means for storing data,
    receive control means for generating control signals,
    receive shift register means comprising means responsive to said control signals for serially receiving bits of data from said communications medium and means responsive to said control signals for transmitting data received from said communications medium to said receive data register means for storage therein and
    stack memory means for saving information and
    wherein said receive control means further comprises means for counting the number, $N_4$, of consecutive bits received from said communications medium having a predetermined logic value, means for generating control signals for inhibiting the reception by said receive shift register means of a bit from said communications medium when said number, $N_4$, equals a predetermined number and means responsive to said start preemption signal for generating control signals for effecting a saving by said stack memory means of a representation of said number, $N_4$.

36. An arrangement in accordance with claim 35 further comprising
    means for transmitting an end preemption signal on said communications medium and
    wherein said receive control means further comprises means responsive of said end preemption signal for generating control signals for effecting a transmission from said stack memory means to said receive control means of said representation of said number, $N_4$, saved by said stack memory means.

37. An arrangement comprising
    means for transmitting a start preemption signal on a communications medium,
    receive data register means for storing data,
    receive control means for generating control signals,
    receive shift register means comprising means responsive to said control signals for serially receiving bits of data from said communications medium and means responsive to said control signals for transmitting data received from said communications medium to said receive data register means for storage therein,
    frame check sequence generator means for generating a frame check sequence of bits from bits received from said communications medium and
    stack memory means for saving information and
    wherein said receive control means further comprises means responsive to said start preemption signal for generating control signals for effecting a saving by said stack memory means of said frame check sequence.

38. An arrangement in accordance with claim 37 further comprising
    means for transmitting an end preemption signal on said communications medium and
    wherein said receive control means further comprises means responsive to said end preemption signal for generating control signals for effecting a transmission from said stack memory means to said frame check sequence generator means of said frame check sequence saved by said stack memory means.

39. A communication system for communicating data from a plurality of user devices over a communications medium comprising
    transmit data register means for storing data,
    a plurality of formatter interfaces each associated with one of said user devices for receiving data from that user device and transmitting that data to said transmit data register means for storage therein, transmit control means for generating first control signals, transmit shift register means comprising means responsive to said first control signals for reading data from said transmit data register means and means responsive to said first control signals for serially transmitting bits of data read from said transmit data register means to said communications medium, processor means comprising selection means for selecting a given one of said formatter interfaces while a given other one of said formatter interfaces is transmitting data to said transmit data register means, means responsive to said selection means for interrupting data transmission by said given other one of said formatter interfaces and means responsive to said selection means for initiating data transmission by said given one of said formatter interfaces, first stack memory means for saving information, means responsive to said selection means for transmitting a start preemption signal on said communications medium, receive data register means for storing data, receive control means for generating second control signals, receive shift register means comprising means responsive to said second control signals for serially receiving bits of data from said communications medium and means responsive to said second control signals for transmitting data received from said communications medium to said receive data register means for storage therein and second stack memory means for saving information and wherein said transmit control means further comprises means responsive to said selection means for generating control signals for effecting a saving by said first stack memory means of data read by said transmit shift register means but not serially transmitted thereby to said communications medium and wherein said receive control means further comprises means responsive to said start preemption signal for generating control signals for effecting a saving by said second stack memory means of data received by said receive shift register means but not transmitted thereby to said receive data register means.

40. A communication system in accordance with claim 39 wherein each of said plurality of formatter interfaces further comprises means for transmitting a completion signal to said processor means indicating the end of data transmission by that formatter interface, wherein said processor means further comprises means responsive to said completion signal for transmitting an end signal to said transmit control means and means responsive to said completion signal for reinitiating data transmission by said given other one of said formatter interfaces, wherein said transmit control means further comprises means responsive to said end signal for generating control signals for effecting a transmission from said first stack memory means to said transmit shift register means of said data saved by said first stack memory means, wherein said communication system further comprises means responsive to said end signal for transmitting an end preemption signal on said communications medium and wherein said receive control means further comprises means responsive to of said end preemption signal for generating control signals for effecting a transmission from said second stack memory means to said receive shift register means of said data saved by said second stack memory means.

41. A communication system in accordance with claim 39 further comprising multiplexer means for transmitting bits having a first predetermined logic value to said communications medium, first frame check sequence generator means for generating a first frame check sequence of bits from bits transmitted by said transmit shift register means, second frame check sequence generator means for generating a second frame check sequence of bits from bits received from said communications medium and wherein said transmit control means further comprises means for counting the number, $N_1$, of bits of data transmitted by said transmit shift register means since a reading of data from said transmit data register means by said transmit shift register means, means responsive to said selection means for generating control signals for effecting a saving by said first stack memory means of a representation of said number, $N_1$, means for counting the number, $N_2$, of consecutive bits of data transmitted by said transmit shift register means having a second predetermined logic value, means for generating control signals for effecting the transmission by said multiplexer means of a bit having said first predetermined logic value when said number, $N_2$, equals a predetermined number, means responsive to said selection means for generating control signals for effecting a saving by said first stack memory means of a representation of said number, $N_2$, and means responsive to said selection means for generating control signals for effecting a saving by said first stack memory means of said first frame check sequence and wherein said receive control means further comprises means for counting the number, $N_3$, of bits of data received by said receive shift register means since a transmission of data by said receive shift register means to said receive data register means, means responsive to said start preemption signal for generating control signals for effecting a saving by said second stack memory means of a representation of said number, $N_3$, means for counting the number, $N_4$, of consecutive bits received from said communications medium having said second predetermined logic value, means for generating control signals for inhibiting the reception by said receive shift register means of a bit from said communications medium when said number, $N_4$, equals said predetermined number, means responsive to said start preemption signal for generating control signals for effecting a saving by said second stack memory means of a representation of said number, $N_4$, and means responsive to said start preemption signal for generating control signals for effecting a saving by said second stack memory means of said second frame check sequence.

42. A communication system in accordance with claim 41
wherein each of said plurality of formatter interfaces further comprises means for transmitting a completion signal to said processor means indicating the end of data transmission by that formatter interface,
wherein said processor means further comprises means responsive to said completion signal for transmitting an end signal to said transmit control means and means responsive to said completion signal for reinitiating data transmission by said given other one of said formatter interfaces,
wherein said transmit control means further comprises means responsive to said end signal for generating control signals for effecting a transmission from said first stack memory means to said transmit shift register means of said data saved by said first stack memory means, means responsive to said end signal for generating control signals for effecting a transmission from said first stack memory means to said transmit control means of said representation of said number, $N_1$, saved by said first stack memory means, means responsive to said end signal for generating control signals for effecting a transmission from said first stack memory means to said transmit control means of said representation of said number, $N_2$, saved by said first stack memory means and means responsive to said end signal for generating control signals for effecting a transmission from said first stack memory means to said first frame check sequence generator means of said first frame check sequence saved by said first stack memory means,
wherein said communication system further comprises means responsive to said end signal for transmitting an end preemption signal over said communications medium and
wherein said receive control means further comprises means responsive to said end preemption signal for generating control signals for effecting a transmission from said second stack memory means to said receive shift register means of said data saved by said second stack memory means, means responsive to said end preemption signal for generating control signals for effecting a transmission from said second stack memory means to said receive control means of said representation of said number, $N_3$, saved by said second stack memory means, means responsive to said end preemption signal for generating control signals for effecting a transmission from said second stack memory means to said receive control means of said representation of said number, $N_4$, saved by said second stack memory means and means responsive to said end preemption signal for generating control signals for effecting a transmission from said second stack memory means to said second frame check sequence generator means of said second frame check sequence saved by said second stack memory means.

43. In a communication system for communicating from a plurality of user devices over a communications medium in frames, said communications system including coupling means for selectively coupling said user devices to said communications medium for communication, said coupling means being associated with a set of status variables collectively defining the present status of said coupling means, a method of gracefully preempting the transmission over said communication medium of a first frame from a first one of said user devices before a portion of said first frame is transmitted comprising
saving values of said set of status variables,
transmitting a preempt character over said communications medium and
transmitting a second frame from a second one of said user devices over said communications medium before said portion of said first frame is transmitted.

44. A method in accordance with claim 43 further comprising
returning, after said second frame is transmitted, said coupling means to the status defined by said saved values of said set of status variables and
transmitting, after said second frame is transmitted, said portion of said first frame.

* * * * *